United States Patent
Jedwab

(10) Patent No.: US 9,805,582 B2
(45) Date of Patent: Oct. 31, 2017

(54) INTEGRATIVE SECURITY SYSTEM AND METHOD

(71) Applicant: Eran Jedwab, Modi'in (IL)

(72) Inventor: Eran Jedwab, Modi'in (IL)

(*) Notice: Subject to any disclaimer, the term of this patent is extended or adjusted under 35 U.S.C. 154(b) by 5 days.

(21) Appl. No.: 15/134,413

(22) Filed: Apr. 21, 2016

(65) Prior Publication Data

US 2016/0232777 A1 Aug. 11, 2016

Related U.S. Application Data

(63) Continuation-in-part of application No. PCT/IL2016/050041, filed on Jan. 14, 2016.

(30) Foreign Application Priority Data

Jan. 15, 2015 (IL) .......................................... 236752

(51) Int. Cl.
G08B 31/00 (2006.01)
G08B 25/00 (2006.01)
(Continued)

(52) U.S. Cl.
CPC ..... *G08B 25/001* (2013.01); *G08B 13/19602* (2013.01); *G08B 13/19608* (2013.01);
(Continued)

(58) Field of Classification Search
CPC ................................................ G08B 13/19608
(Continued)

(56) References Cited

U.S. PATENT DOCUMENTS

2006/0048286 A1* 3/2006 Donato .................. A42B 3/042
2/422
2006/0224797 A1* 10/2006 Parish .................. G08B 25/006
710/62

(Continued)

FOREIGN PATENT DOCUMENTS

WO WO 2006128124 A2 * 11/2006 ............. G08B 25/14
WO 2007032731 A1 3/2007

OTHER PUBLICATIONS

International Search Report from a counterpart foreign application—PCT/IL2016/050041—mailed Apr. 7, 2016, 3 pages.
(Continued)

*Primary Examiner* — Benyam Haile
(74) *Attorney, Agent, or Firm* — David P. Lentini

(57) ABSTRACT

A method for monitoring and securing a facility without employing a manned control center, according to which a server acquires surveillance data from each of a plurality of distributed surveillance devices deployed within or adjacent to a given security sensitive facility. Then the server receives an intrusion alert from a guard, or from one or more of the plurality of surveillance devices to initiate a triggering event, if the acquired surveillance data is indicative of activity that has been detected at an indicated location. A first guard is alerted and presented with a full situational awareness image to assess the severity of the detected activity and the triggering event is terminated if found by the first guard to be of a low severity, or an interception operation initiated by self-dispatching or dispatching one or more additional guards to a close by location that holds tactical advantage relative to the indicated location if the triggering event was found by the first guard to be of a high severity.

25 Claims, 7 Drawing Sheets

(51) Int. Cl.
    *G08B 27/00*    (2006.01)
    *G08B 25/10*    (2006.01)
    *G08B 13/196*   (2006.01)
    *H04N 7/18*     (2006.01)

(52) U.S. Cl.
    CPC . *G08B 13/19652* (2013.01); *G08B 13/19654* (2013.01); *G08B 25/10* (2013.01); *G08B 27/001* (2013.01); *G08B 31/00* (2013.01); *H04N 7/18* (2013.01); *H04N 7/181* (2013.01)

(58) Field of Classification Search
    USPC .......................................................... 340/8.1
    See application file for complete search history.

(56) References Cited

U.S. PATENT DOCUMENTS

| | | | |
|---|---|---|---|
| 2009/0231122 A1* | 9/2009 | Yeung ............... | G08B 13/19652 340/524 |
| 2015/0049190 A1 | 2/2015 | Galvez et al. | |
| 2015/0204109 A1* | 7/2015 | Ergenbright ........... | G05B 13/00 340/541 |

OTHER PUBLICATIONS

Written Opinion of the International Searching Authority from a counterpart foreign application—PCT/IL2016/050041—mailed Apr. 7, 2016, 5 pages.

\* cited by examiner

INTEGRATIVE SECURITY SYSTEM AND METHOD

FIELD OF THE INVENTION

The present invention relates to the field of security systems. More particularly, the invention relates to a system and method for monitoring and securing a facility or area while minimizing manpower and improving the effectiveness of security response.

BACKGROUND OF THE INVENTION

Physical intrusion is a major threat for many types of sites and facilities. Government, commercial, public and even private sites are threatened by active shooters, burglars, vandalisms and the like. In order to secure the facility and its surroundings, an indoor and/or outdoor security system is often employed. The security system generally comprises sensors capable of scanning or observing the facility and surrounding area. Those sensing devices are positioned at different locations throughout the facility, in order to facilitate monitoring of the site. Some of the devices are sensors capable of detecting any intrusion into the facility. Such detection sensors may be motion detectors, break-in sensors, video analytics mechanisms, or the like. Other imaging devices are used for visual monitoring and recording of the activity within the facility. Those imaging devices are capable of capturing detailed images from the site and usually format it as video signals. Such devices may be optical or thermal cameras or any other type of imaging device. The image data and other sensed data including detection alerts are transmitted to a computerized workstation of a control center, equipped with processing and display means and operated by a member of the control center staff (hereinafter "operator"). Such control center may be established and operated either on site or remotely. The staffing of the control center may be based on employees of the site, or through outsourcing to a monitoring company, employing operators that service multiple sites.

The work station, receiving detection alert data, as a result of special events being detected or reported, alerts the operator, to draw his attention and drive him to react to the event. Imaging data and video signals received from imaging devices are displayed by the work station, to allow the operator to assess the level of threat imposed on the protected site, either from such reported or detected event or continuously, through constant monitoring. Based on this visual assessment, the operator may be able to decide on how to further act as a response to the event.

The work station controls imaging devices, equipped with pan, tilt and zoom mechanisms and slews them to the location of the detected object that initiated the event or to preset locations within the monitored site, or to locations, requested by the user. Imaging video signals from such controlled imaging devices as well as from fixed imaging devices, lacking the pan, tilt and zoom controllability, are switched and routed to the work station's display to enable the operator to monitor the space within the facility—covered by such imaging devices.

Certain detection devices are able to track a detected object by further updating the location information of the detected object as it maneuvers within the monitored area, subject to the tracking device's capabilities. Such continuous tracking, enables the work station to update and retransmit further commands to an imaging device to allow continuous visual tracking of the moving object. This grants the operator with enough time for reliable assessment of the threat imposed on the protected site by detected movement within or around the site.

In order to facilitate these roles of the operator, the work station usually consists of two types of display; a geographical display and one or more visual displays. The geographical display enables overall situational awareness by reflecting the locations of the detected activities, of the security system's deployed devices and of other objects within the secured facility or area in real time. The visual display, on the other hand, is usually a video based focused display of the detected threats or requested locations, which allows the operator to assess the nature and intents of observed threats.

In case the operator assesses a detected activity as a potentially threatening intrusion, that needs to be intercepted, his reaction may be to alert security personnel on call (hereinafter "response team") and have them dispatched to the detected event's location. But if the detected event is assessed as an innocent routine activity, the operator may decide to disregard the event and return back to his routine activity. The alerted security response team is notified concerning the whereabouts of the intruder, and work in unison in response to control center initiated advice and on-going directions in order to intercept and apprehend the intruder. Other law enforcement personnel from external agencies may also be contacted in order to provide further assistance.

In order to be effective during an intrusion event, that may occur at any moment, the control center has to be continuously manned, dramatically adding to its operational costs. An additional disadvantage of employing a manned control center is that a control center operator has to continuously mediate verbally describe the information regarding the situation to each security response professional (hereinafter "guard") in order to coordinate their movement during an interception operation, which is an evolving event. The remote mediation of information to each guard while commanding operation of the surveillance devices is time consuming, and may be subject to error if the operator is not fully alert and focused. In cases of outsourced monitoring services, on which a single operator services many sites concurrently, his attention is further limited and the operator may not be able to dwell upon the event and direct a full interception operation. In such cases, the guards may be only simplistically dispatched to the facility with insufficient information to act effectively.

At times, image information transmitted to the security response team concerning the whereabouts of the intruder may not be useful due to an obstructed line of sight between a guard or the surveillance device and the instantaneous location of the intruder, for example when the intruder is hidden in a recess or behind a boulder or a wall or other parts of the building within the facility.

During the course of visually tracking a maneuvering intruder, the image information captured by the imaging device may not reflect the updated location of the intruder. This is due to periodical operation of the tracking detection device and to system delays, which accumulate from the time the intruder's location is measured by the tracking detection device, up to the time the imaging device points at that location, in response to system commands.

The operator of a manned control center is burdened with various tasks while required to be alert and react promptly to hazardous events. The operator must instantly comprehend the severity of an evolving in-field event and react effectively in real time. In case the operator is not sufficiently vigilant, or the situation is sufficiently described to the field response, the intruder may not be intercepted in a timely manner to prevent the damage. In such cases of late or ineffective response, the intruder would gain the tactical advantage and the capabilities of the security system may be utilized mainly for after the fact documentation and as a source of evidence.

During his surveillance tasks, the operator's perception, regarding the threat imposed on the protected site, is formed by a human-data-fusion process, combining two different views of the situation in the field. The perspective of the visual display is based on the viewpoint from the imaging device's location as was deployed in the field. On the other hand, the geographical display's perspective is typically that of a "bird-view" from above the field (if 2D display mode is employed). Alternatively, the geographical display's perspective can be freely set by the operator (if 3D display mode is employed). Such differing perspectives of those two views may blur the context of the displays and confuse the operator's orientation. As a result, this delicate process of human-data-fusion, which is highly prone to distractions, may be hindered, decreasing the precision and consistency of the information and guidance communicated to the response personnel.

It would be desirable to allow the guard to be self-assisted by the security system, without being completely dependent on the command center.

It would be desirable to allow the guard to get an immediate full situational awareness image, as captured by the system's devices, while maneuvering within or around the site, without being overwhelmed by a complicated display of such information that may be hard for him to comprehend.

It would be desirable to integrate the techniques and capabilities of an unmanned control center for the benefit of the supervision provided by an operator within a manned control center or other supervisor, to improve the functioning of a guard. In addition, a full situational awareness image being available to a guard, streamlines the coordination between the operator and the guard by refraining the operator from awkwardly guiding the guard through verbal directions.

In case an operator monitoring the secured site within a manned command center, it would be desirable to allow an effective collaboration among the operator and the guards in the field, according to a policy regarding the preferred balance of operator's involvement vs. field guard's autonomy that may be defined by the site's security officers.

In the absence of detection sensors, or at crowded areas, it would be desirable to allow a human scout or an observer of the scene to generate a notification of an event, evolving in the field.

In the absence of other surveillance devices, being able to cover the scene of threatening events or ongoing attacks, it would be desirable to monitor sensors, carried by close-by humans, without any actions required from the close-by humans that may be under attack.

In the absence of any information regarding the location of the intruder, it would be desirable to allow the guard to have a situational awareness that will grant him with tactical advantage and refrain him from physically sweeping every area, space or room within the facility, while being exposed to attacks from the intruder or caught in the intruder's line of fire.

In cases of multiple guards, engaged in an interception operation, it would be desirable to help guards to avoid incidents of friendly crossfire between the guards.

At sites with narrow perimeters, which an intruder may swiftly traverse, it would be desirable to allow quicker responses of the security system to facilitate the prevention of damages.

As the guard is reacting to the intruder trespassing the secured site, the intruder has an inherent tactical advantage over the guard. It would be desirable to grant the guard back with tactical advantage to facilitate and enable the interception of the intruder.

It is an object of the present invention to provide an integrative security system and method for unmanned monitoring of a facility.

It is an additional object of the present invention to provide an integrative security system and method for securing a facility without need of a control center.

It is an additional object of the present invention to provide a method that allows a mobile user to precisely outline and edit graphical objects by use of a single gesture operation such as with touch screen based user interface of a mobile terminal.

It is an additional object of the present invention to provide a security system that improves visibility of an intruder during the course of the assessment of the threat and of an interception operation.

It is an additional object of the present invention to improve and support the process of human-data-fusion required for gaining full situational awareness to allow immediate and accurate reaction and guidance.

It is an additional object of the present invention to provide a security system that helps to direct and assist the response team personnel during the course of an interception operation.

The operator of a manned control center is burdened with various tasks while required to be alert and prompt to react to hazardous events. While an intrusion event is evolving—the operator is required to comprehend the situation in the field and to react effectively in real time. Therefore, it is an object of the present invention to integrate techniques and capabilities of the unmanned control center within a manned control center to improve the functioning of the operator.

It is another object of the present invention to enable the system administrator or a security officer to define the surveillance policy that will set the preferred balance between the level of involvement of an operator within a manned command center and the level of autonomy of the guards in the field.

It is another object of the present invention to provide a human scout or a field observer to generate an effective notification of an event, evolving in the field.

It is another object of the present invention to monitor sensors, carried by humans and located close-by to the location of the event, without any action required to be carried out by the humans.

It is another object of the present invention to allow the guard to effectively sweep and scan the facility in order to rapidly locate threats without having to physically go over every area, space or room within the facility and without being caught in the intruder's views or line of fire.

It is another object of the present invention to allow each guard to be aware of any friendly personnel in front of him, to avoid cases of crossfire between the guards.

It is another object of the present invention to enable a quick response to intrusion events at sites with narrow perimeters that will precede the intruder and prevent damages.

It is another object of the present invention to grant the guard with tactical advantage relative to the intruder, by setting the right locations and routes for dispatching the guard that will facilitate and enable the interception of the intruder.

It is another object of the present invention to further grant the guard with tactical advantage by selectively blocking and unblocking paths within the facility through transmitted commands to deployed remotely controllable actuators such as locks and barriers.

Other objects and advantages of the invention will become apparent as the description proceeds.

SUMMARY OF THE INVENTION

The present invention provides a method for monitoring and securing the interior as well as the exterior of a facility without employing a manned control center, comprising the system performed steps of acquiring surveillance data from each of a plurality of distributed surveillance devices deployed within or adjacent to a given security sensitive facility; receiving an intrusion alert from one or more of the plurality of surveillance devices or through human initiated action, pointing on the location of the threat, or a general emergency call, to initiate a triggering event, if the acquired surveillance data is indicative of activity that has been detected at an exact or inexact indicated location; alerting a first guard to remotely assess the severity of the detected activity through his mobile terminal device; terminating the triggering event if found by the first guard to be of a low severity, or initiating an interception operation by self-deploying or dispatching one or more additional guards to a close by location that holds tactical advantage relative to the indicated location if the triggering event was found by the first guard to be of a high severity; and presenting a full situational awareness image to one or more of the plurality of intercepting guards, presented from their own perspective to facilitate quick understanding of the situation.

In one aspect, the dispatching step is performed by the system's server—determining an instantaneous location of each guard on call by means of the location of a corresponding terminal device; determining whether each of the guards on call is located within a dispatchable distance from the indicated location; transmitting a wakeup signal or a push notification to selected guards located within the dispatchable distance; and setting the terminal device of each of the selected guards to an active mode. Alternatively, the guard can initiate the triggering event by himself.

In one aspect, the server directs the dispatched guards to a specified location through specified route that grant the guard with tactical advantage over the intruder.

In one aspect, the server presents the guard with a plurality of routes, holding various aspects of tactical advantage, to allow the guard or an operator to select the preferred aspect of tactical advantage that best fits the situation at hand.

In one aspect, the server controls, either automatically or through specific requests from the guard, the field situation by transmitting commands to actuators such as remotely controllable locks and barriers—deployed in the field, to change the available paths for the intruder and the guard, so the guard's tactical advantage may be maximized.

In one aspect, the terminal device of each of the selected guards involved in an interception operation receives default surveillance data related to a server specified location or area. The received default surveillance data may be the surveillance data generated by one or more surveillance devices that provide a server-determined optimal coverage for the specified location.

In one aspect, the instantaneous coverage of the surveillance imaging device is automatically controlled to produce smooth visual tracking of the intruder, preserving the intruder constantly within the instantaneous coverage of the surveillance device.

In one aspect, surveillance devices are borne by drones or any other flying or differently transportable platform.

In one aspect, the terminal device allows one of the dispatched guards to request to receive surveillance data generated by another surveillance device and actively control the instantaneous coverage generated by the corresponding surveillance device.

In one aspect, surveillance data is collected by sensors such as microphones, location sensors, or any other type of sensor, embedded within mobile devices, carried by humans, close enough to the threatening occurrence to be sensed by the sensors, without any action required from the humans, carrying the mobile devices.

In one aspect, the server disregards an intrusion alert acquired from a surveillance device located within a predetermined non-detectable region of the facility.

In one aspect, the terminal device allows a user precisely to outline the predetermined non-detectable regions, alarm regions and any other graphical objects within the geographical display by use of a single gesture operation such as with touch screen based user interface of a mobile terminal without the need of a desktop workstation.

In one aspect, the terminal's display combines and unifies the spatial overview of the geographical display with the highly visually detailed view of the video display.

In one aspect, the terminal's unified situational awareness display combines the spatial representation of the facility by a 3D model of the facility's interior and/or exterior, thereby delivering an augmented reality display from the guard's perspective.

In one aspect, the terminal device displays a 3-D geographical model of the facility with partial or full transparency to allow the guard to observe the unified surveillance information, although being concealed by the facility's structures, walls and the like to grant the guard with further tactical advantage.

In one aspect, the terminal device's situational awareness display indicates the location of other guards, involved in the interception operation, to help preventing friendly crossfire and other contradicting operations.

In one aspect, intruder interception is conducted by the server through a structured operational process.

The present invention is also directed to a system for monitoring and securing a facility without employing a manned control center, comprising a plurality of distributed surveillance devices deployed within or adjacent to a given security sensitive facility, a plurality of mobile terminal devices held or carried by a corresponding guard serving to protect the facility, and a server for receiving data wirelessly or by wired communications from each of the surveillance devices and from each of the terminal devices, and for transmitting data to one or more of the surveillance devices and terminal devices during an interception operation, wherein the server is operable to regularly acquire and buffer surveillance data from the plurality of surveillance devices for later examination, receive an intrusion alert from one or more of a plurality of terminal devices and/or from one or more of the plurality of surveillance devices based on the acquired surveillance data, and to transmit a wakeup signal to the corresponding terminal device of one or more guards located within a dispatchable distance to a location of an activity that has been detected within the facility, to ensure that the one or more guards will be involved in assessment or intruder interception related activities.

In one aspect, the assessment related activities include remote assessment of an event by use of the terminal device to display real-time and recently buffered data and images collected from a surveillance device.

In one aspect, the system includes a workstation for an operator monitoring the secured site within a command center, while the operator is involved in the surveillance and interception operations through a set level of involvement, selected from a variety of options by the system administrator or security officer.

In one aspect, the alert is generated by a human scout, operating a mobile terminal device, to mark the actual location of the threat and to add an audio and/or visual descriptions of the event.

DETAILED DESCRIPTION OF PREFERRED EMBODIMENTS

The present invention is a decentralized security system for continuous unmanned monitoring the interior and/or the exterior of a security sensitive facility or area, for automatic alerting, if needed, of guards on call of a security response team that an intruder has been detected and has to be intercepted and for supporting intruder interception operation through presentation of a situational awareness image from the guard's perspective and/or through granting a tactical advantage to the guards over the intruder.

Prior art security systems utilize video management capabilities by use of mobile devices and cloud services to separate a security infrastructure from the physical site. The present invention improves such capabilities by combining recent advances in information technologies, such as a cloud based system and mobile computing, with GIS technologies, augmented reality techniques, and a unique analysis and display module, resulting in a holistic concept for a security system whereby guards are directly assisted during their surveillance and interception tasks.

Figure 1:
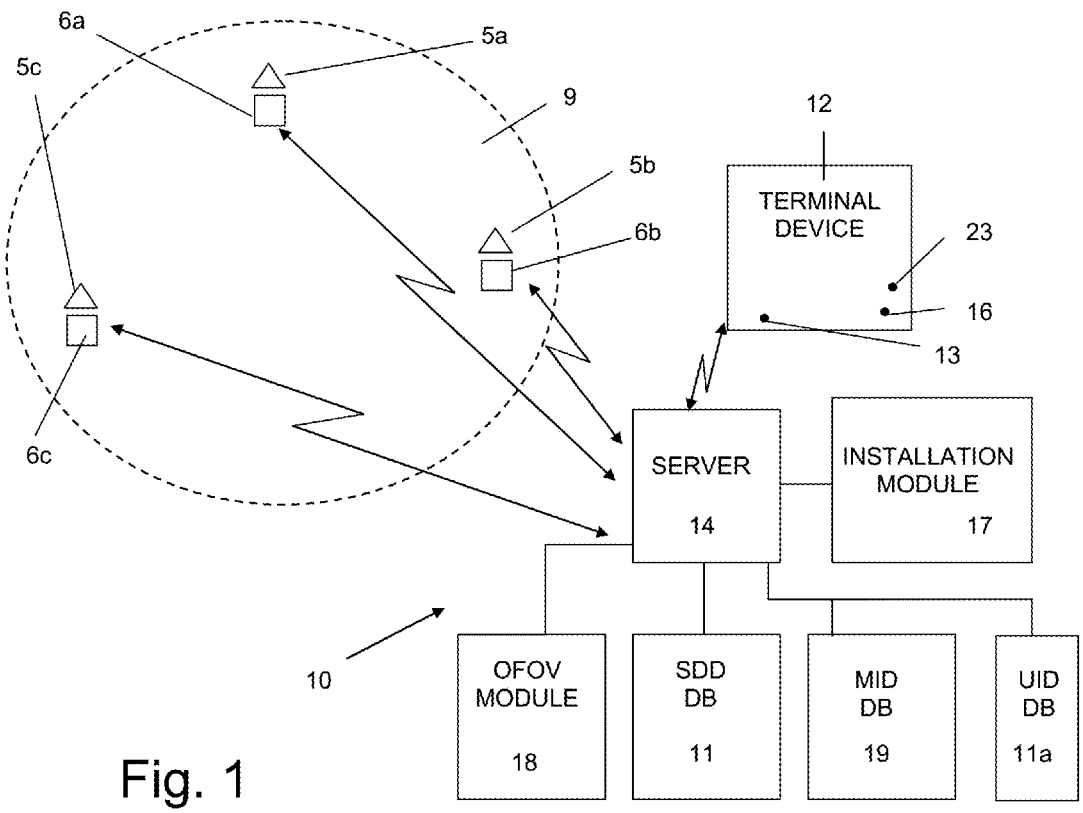
FIG. 1 is a schematic illustration of a security system according to one embodiment of the present invention.

FIG. 1 schematically illustrates a security system generally indicated by numeral 10 according to one embodiment of the present invention. Security system 10 comprises a plurality of distributed surveillance devices, which may be fixed, borne on a transportable platform or embedded within mobile devices, carried by humans and/or a plurality of actuators such as remotely controllable locks and barriers 5a-c, e.g. three or any other number deployed with or without corresponding processing nodes 6a-c, within or adjacent to a given facility or area 9, at least one mobile terminal device 12 held or carried by a corresponding guard serving to protect the facility in interaction with the system, and a server 14 for receiving data from surveillance devices or actuators 5a-c, or from the processing nodes 6a-c, and from each terminal device 12, and for transmitting data to one or more of these devices. Server 14 further comprises at least one component for processing customized instructions (such as a processor or FPGA), one or more transient and persistent memories (such as RAM, ROM, EEROM, and hard disk memories), at least one network interface connected to a wired and/or wireless network, and at least one customized control program effective to receive information (e.g. alerts, sensor information) from the wired and/or wireless network and to send information, including alerts, sensor information, and sensor commands, to devices of the surveillance system. The customized control program provides processing instructions to the processing component that cause the processing component to implement portions of the instant invention. The server may further comprise operating system software (e.g. Linux or Windows Server) and specialized database software, such as commercial database software provided by Oracle Corporation, both stored in a memory of the server and executed by the processing component.

Surveillance devices, actuators, processing nodes, terminal devices, and database/modules (e.g. 11, 11a, 18, 19) may be implemented as a stand-alone modules with independent processing components, memories, network interface, control programs, configuration data (including alerting rules and triggering event definitions) and the like, or one or more of these components may be integrated into a server without deviation from the intent of the instant invention. Furthermore, surveillance devices, actuators, processing nodes, terminal devices, servers, and modules are interconnected using wired and/or wireless networking so that information may flow between them.

Each surveillance device and actuator 5 or processing node 6 and terminal device 12 has an identifier so that it can be accurately accessed through the network. Alternatively, there can be direct connections between terminal devices 12 and the sensors or their corresponding processing nodes.

Server 14 may transmit data to the surveillance and terminal devices in a selective push mode according to predetermined rules and configurations or in a pull mode in response to a request for information. Selective push data may include alerting signals and other types of information originated by the sensors, generated by other terminals of the system or as a result of collection of conditions being processed by the system's server and found to be met. Such data may include new detections by the system's sensors or updates to information about former detections. Another type of push data may be alerts or notifications initiated by other users of the system, either through their mobile terminals or desktop workstations.

A surveillance device, either fixed, transportable on a platform or carried by a human, may be an optical or thermal imaging sensor, such as a camera which is movable to cover a certain area upon receiving a suitable input command, such as POSITION or SCAN (described later). A surveillance device may also be a projector for illuminating a corresponding sector of the facility upon demand or a microphone for capturing audible information emitted from a corresponding sector of the facility upon demand, and may also be moved or adjusted upon receiving a suitable input command. Video motion detection, video analytics or other analysis mechanisms analyzing video signals acquired from such deployed imaging sensors may produce alarm signals upon detection of movement or other abnormal activity. Such video analysis may be performed within the sensor, by a small processor adjacent to the deployed device (e.g. a processing node 6), or by a central processor co-resident within or adjacent to the server. Abnormal activity may also be detected based on any other sensed phenomena such as sound, radio signals and the like. A single or a plurality of radar devices may also be used as surveillance devices for constant scanning of the area surrounding or within the facility. Electronic sensors adjacent to a fence may also be used as surveillance devices for scanning the fence or the vicinity of the fence. A human scout may also utilize a mobile terminal to initiate an alert and mark its geographical location. The user may use the user interface of the mobile terminal to add additional audio and/or visual descriptions of the alerted event. A threatening occurrence may also be monitored by sensors embedded within mobile devices, carried by humans, situated near the occurrence, without any action required from the carrying humans.

One or more of these surveillance devices generally have a default instantaneous coverage, which is indicative of a combination of conditions that define parameters of autonomous automated operation performed with a given surveillance device. For example when the surveillance device is a camera, the instantaneous coverage is defined by a scanning range, the distance and angle of the surveillance device with respect to a specified landmark and by the magnification of the scanned image. In case such camera is airborne, its location and altitude may also be controlled. Each surveillance device may be configured, when activated, to automatically operate and transmit the autonomously collected data according to its default coverage. However, the instantaneous coverage will change when the corresponding surveillance device and/or its carrying platform is kinematically adjusted.

Each processing node 6 can be optionally attached to one or more surveillance device or actuator 5. This node is generally a small computing device with local storage and computing capabilities. Processing Node 6 further comprises at least component for processing customized instructions (such as a processor or FPGA), one or more transient and persistent memories (such as RAM, ROM, EEROM, and hard disk memories), at least one network interface connected to a wired and/or wireless network, and at least one customized control program effective to receive information (e.g. sensor information, commands) from the wired and/or wireless network and to send information, including alerts, sensor information, and sensor commands, to devices of the surveillance system. The customized control program provides processing instructions to the processing component within the processing node 6 that cause the processing component to implement portions of the instant invention.

Another way of sensing may be performed through embedded sensors within mobile devices, carried by humans, situated close to the monitored occurrence. Such sensing may utilize standard mobile sensing capabilities such as audio, movement, location or any other sensed phenomena. The mobile sensing may be processed by the carried mobile device's processor, which may also run a standard mobile operating system software (e.g. Android, iOS or Windows Phone) and a specialized application, stored in a memory of the mobile device. The application may allow the human carrying the mobile device to express his consent to utilize the embedded sensors in case of such threatening event while the user is within or adjacent to the secured facility or area.

The server may further comprise operating system software (e.g. Linux or Windows Server) and specialized database software, such as commercial database software provided by Oracle Corporation, both stored in a memory of the server and executed by the processing component.

Processing nodes are interconnected to other devices of the surveillance system using wired and/or wireless networking so that information may flow between them.

In an implementation, the processing node assures no data is lost when communication with the server 14 is terminated or temporarily interrupted. Also, the processing node may be used for direct networking with a guard's terminal device 12, enabling much shorter delays during surveillance device and actuator command and control. In addition, such computing node may perform detailed command and control decisions and actions such as smooth tracking of a detected threat as will be described hereinafter, alert generation and decisions on what content is forwarded directly to the guard and which is sent to the common server. In addition, acquired surveillance data can be buffered and stored by the processing node in a protected mode for later examination.

Each terminal device 12 is generally a small, hand-held computing device, for example a smartphone, tablet, and laptop computer or any other wearable device such as glasses or the like, which is capable of running a standard mobile operating system software (e.g. Android, iOS or Windows Mobile) and software applications, and typically has a screen for displaying video and other imaging signals with a gesture based input such as touch or any other sort of gesture. The terminal device 12 is multi-functional and has geographic information system (GIS) capabilities for capturing, storing, manipulating, analyzing, managing and presenting geographically referenced data, in addition to communication capabilities for exchanging voice, image and data information with another terminal device or with server 14. An orientation sensor 13 may be included, for encoding the user's pointing direction for device control or for marking the location of manually alerted events and for toggling between a geographical mode whereby pertinent GIS data is graphically displayed and an imaging mode whereby real-time video information is displayed, depending on the selected orientation of the terminal device, as will be described hereinafter. Alternatively, the imaging data may be unified and combined with the geographical display, as will be described hereinafter. A take-over button 16 may be provided, for actively controlling the disposition of one or more surveillance devices, as will be described hereinafter. A built-in camera and microphone allows the user to add visual and/or audio descriptions of manually alerted events. For minimizing power consumption, each terminal device 12 normally operates in a standby mode and is set to an active mode upon receiving a wakeup signal or a push notification from server 14, in response to a triggering event. In addition, the guard can initiate the triggering event by himself by interacting with one or more features of the terminal device such as a push button or any other user interface mean as defined by the system administrator to appear within the terminal device's user interface.

The surveillance and terminal devices need to be properly configured and registered in order to ensure accurate and reliable operation of system 10. During the automatic registration process, an installation module 17 in data communication with server 14 generates one or more links in order to interface each terminal device and each available surveillance device, actuator, or the corresponding processing node, with server 14. Installation module 17 also registers the location and height of each surveillance device set manually through the terminal device or automatically by a GPS receiver or other indoor or outdoor positioning system, provided with the surveillance device deployed in the vicinity of facility 9, or by a positioning receiver provided with the terminal device if positioned at the surveillance device's position, into a surveillance device and actuator database (SDD) 11. Such SDD may store static or dynamic information associated with the deployment of the sensors such as location, installation calibration offsets, recent status and the like. The SDD may be based upon a upon a Commercial Off-The-Shelf (COTS) database such as Oracle or the like or simply as a file stored on a persistent memory accessible to the server and/or processing device. Server 14 (and/or processing device 6) is also in data communication with a map information database (MID) 19, in which is stored all map data related to facility 9, including three-dimensional data of surrounding terrain, roads, exterior and interior of buildings and other landmarks. The MID may be based upon a COTS database such as Oracle or the like or simply as a file stored on a persistent memory accessible to the server.

Server 14 and processing device 6 is also in data communication with a user information database (UID) 11a, in which is stored all information associated with the users of the system, including privileges, login and location data. The UID may be based upon a COTS database such as Oracle or the like or simply as a file stored on a persistent memory accessible to the server.

Server 14 may also comprise or be connected to an obstructed field of view (OFOV) generating module 18. OFOV module 18 is adapted to generate an OFOV map for any field location (indicative of a guard's or intruder's location) or for each surveillance device, taking into account its topographical data and current coverage, as well as the nearby map data. An OFOV may result from a local recess or protrusion in the landscape due to the topographical or the structural data and current instantaneous coverage of a given surveillance device. The OFOV may be calculated statically for static locations such as devices deployed in the field at a given location. In addition, OFOV may also be calculated dynamically and updated on a regular basis for mobile elements such as guards, intruders and mobile devices such as drones carrying payloads of sensors or sensors carried by humans. Such dynamic OFOV information may be calculated either by the server or by the terminal's processor. The resultant OFOV may be stored by either a COTS database such as Oracle or the like or simply as a file stored on a memory accessible to the processor of the terminal or the server.

OFOV information is calculated by mapping a line of sight between two points (e.g. a guard and an intruder, a camera and boundary point), determining if there are obstructions to that line by intersecting the line with features on a GIS map, and recording the end point pair and its obstructed/non-obstructed status. The line of sight calculation may be based on straight lines suitable for optical medium based sensors, or on other types of propagation, based on any other medium used by the device or sensor such as acoustical, radio and the like.

Module 18 may also generate a final composite map for all or group of surveillance devices located within the facility, showing all instantaneous OFOV locations, all areas within the facility that are not scanned by any surveillance device, all overlapping fields of view, or which surveillance device provides an optimal coverage for a given landmark.

Such a composite map may be in the form of a dynamic polygon, or raster, or any other dynamic geometric figure which, when generated, is overlaid on top of a 2D map or an aerial photograph, or a 3D model of the facility, or a portion thereof, showing the requested interrelation of the surveillance devices. In an implementation, the polygon map may be created by computing the polygon that surrounds all points with particular obstructed/non-obstructed status values. The relative location and shape of the generated dynamic geometric figure may be adjusted by performing various types of manipulations such as pan, tilt and zoom with an associated graphical interface or through encoding the mobile device's spatial orientation as held by the user. The representation provided by a composite map improves the user's orientation, as well as cognition of the current disposition of the surveillance devices, in order to facilitate a swift and accurate response.

Server 14 may be deployed locally within the premises of the facility in case the system is required to be isolated from public domain or subject to other considerations that may dictate a local deployment of the server. Alternatively, the server may be deployed remotely with network connectivity to the sensors as well as to the system's mobile terminals and desktop workstations. Such remote networked deployment can be based on a physical or virtual private network such as a public or organizational cloud. The server is configured and the configuration information is stored in a memory of the server with predetermined instructions for detecting a triggering event that may be associated with the event's spatial location, the speed and direction of the detected movement and other schedule associated aspects relative to the actual routine activity around the protected site. In addition, the server may process other dynamic field-conditions related to past activity around the site or to the guards on call, such as their location, their distance and accessibility to the location of the detected event, or other attributes that bear tactical implications over the interception of the intruder such as the direction of approach to the intruder upon interception relative to the sun or any other prominent light source in the field, availability of routes—hidden from the intruder, etc. Such triggering event causes the sever to initiate transmission of a wakeup signal or a push notification to predetermined terminal devices, for alerting the corresponding guard to a specific facility location, or in response to a triggering event initiated by the guard himself to enable the guard to remotely assess the severity of an event in preparation for an interception operation, and for transmitting surveillance data to the dispatched terminal devices during the course of the interception operation, thereby rendering a manned control center unnecessary, or allowing an operator within the control center to maintain his availability to react to alerts from other sites, while an interception operation is being conducted.

Figure 2:
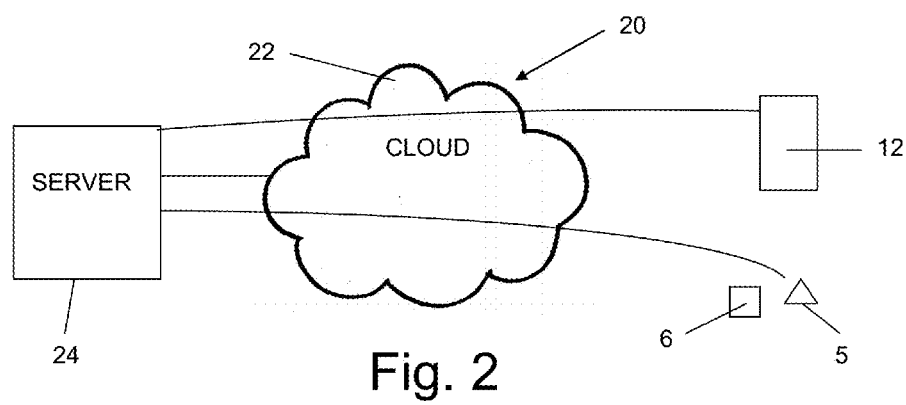
FIG. 2 is a schematic illustration of a security system according to another embodiment of the invention.

As shown in FIG. 2, a server 24 may be integrated with cloud based computer resources (hereinafter "cloud") 22 for providing computation, software, data access and storage services over a network that may be more effective than a locally deployed server. Each surveillance device or actuator 5, or a corresponding processing node 6 thereof, and terminal device 12 of security system 20 is separated from the physical location and configuration of cloud 22, while the cloud 22 provides short term storage for recent timeframes of received surveillance data and long term storage for surveillance data acquired preceding, during and following a triggering event or an interception event. Due to the limited data storage resources provided by cloud 22, short term circular buffering is employed in order to store only recent timeframes of received surveillance data. However in case of a triggering event or an interception event, cloud 22 will lock the accumulated buffers and prevent their reuse in order to provide long term storage and will allocate additional memory space for newly acquired short term data.

Figure 3:
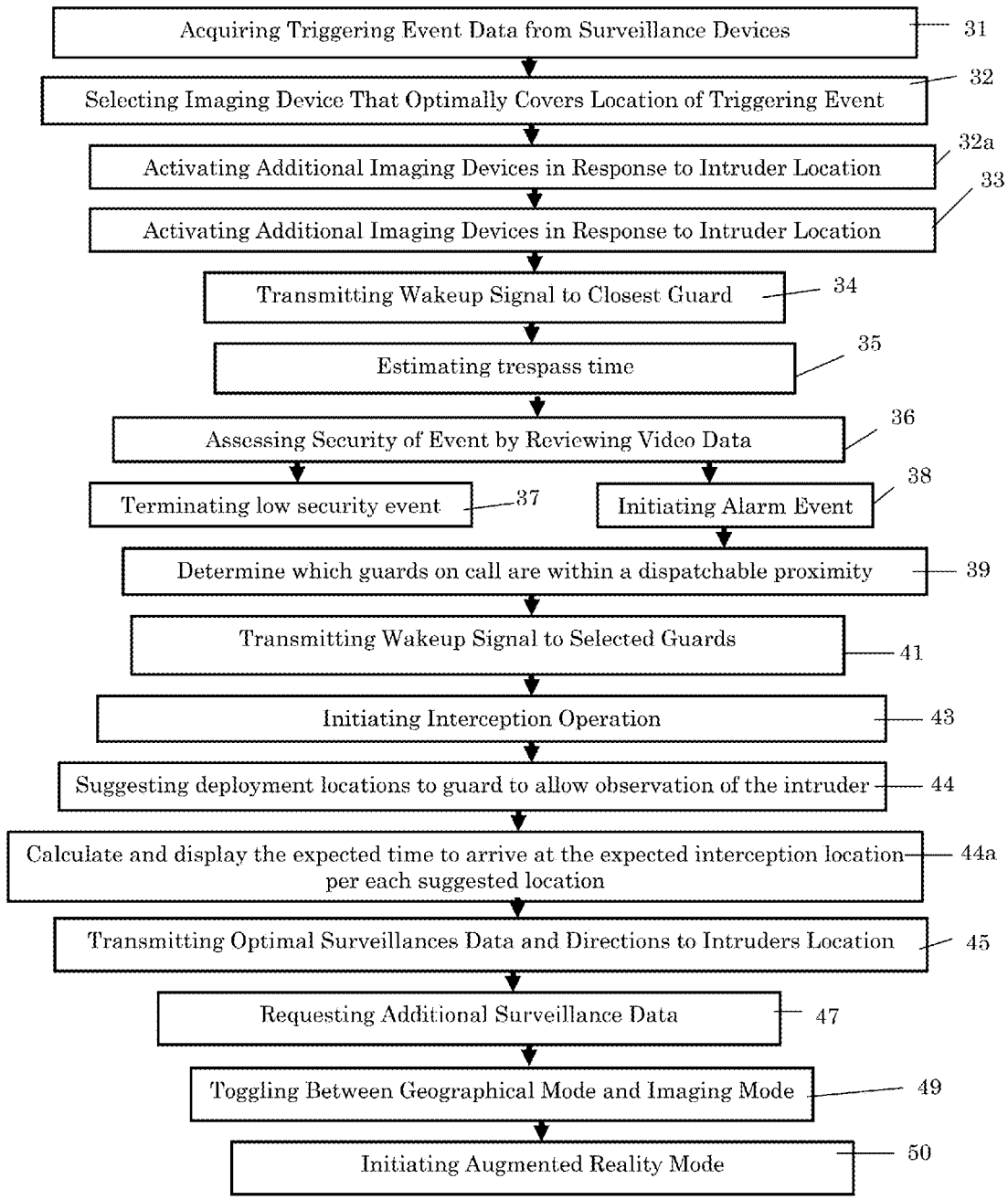
FIG. 3 is a method for monitoring and securing a facility, according to one embodiment of the invention.

FIG. 3 illustrates a method for monitoring and securing a facility, according to one embodiment of the invention.

At first, the server acquires triggering event data in step 31 from one of the distributed surveillance devices, such as radars, electronic fence sensors, motion detection devices, and visual analytics mechanisms for analyzing signals produced by imaging sensors. The event may also be triggered by a human scout, operating a mobile terminal, or through monitoring close-by sensors, embedded within a mobile device, such as a smartphone or a tablet, without any action required to be taken by its user, carrying the mobile device. A triggering event may occur when a movement is detected or other abnormal activity is sensed by one of the distributed surveillance devices in the vicinity of a facility enclosure or within the facility, caused by an animal or intruder. A more severe alarm event may be defined within the configuration information as occurring when a certain intrusion is determined, resulting for example from a fence cutting action, or as a result of a person passing over the enclosure or crossing a radar alarm zone or as a result from a manually triggered event. When the triggering event data or alarm event data originates from a sensor such as an imager, or any other type of motion detection device, the server automatically compares recently stored surveillance data with newly acquired data by video motion detection (VMD), and determines by real time imaging processing and by its stored predetermined rules whether any movement indicative of a triggering event or of an alarm event is detected.

In response to the triggering event, the server will select and activate in step 32 an optimal sensor such as an imaging device which enables the guard to assess the event. Such selection may be based on various criteria such as the distance of the imaging device from the location of the triggering event, the maneuverability of the device towards the triggering event and the visibility of the triggering event's location by OFOV analysis of the imaging device. Such selection will ensure that video images or any other type of information of the triggering event will be generated by an imaging device having the best coverage with minimum obstructions. While the intruder advances in the field the server may utilize the repetitively updating location data of the intruder, received from the detection devices and command in step 32a the imaging device to track and follow the updated location of the intruder, as will be described hereinafter. While the intruder further advances in the field and approaches a less visible area with respect to the location of the selected tracking imaging device, the server may select and subsequently activate additional imaging devices in step 33, in response to the instantaneous location of the intruder. Video images from all or some of the additionally selected imaging devices are displayable by the terminal device, allowing a guard to browse the plurality of generated images, in order to maximize the visual information that is obtainable from the images. Moreover, the multiple imaging data may all be unified and combined with the geographical display to allow immediate assessment, as will be described hereinafter. Such selection of devices to generate as much effective information about the event may be applied to other types of sensing such as acoustical, radio and the like.

The preliminary information made available to the guard's mobile terminal may include spatial restricted information as well as video signals originated by selected imaging devices. In addition, subject to the surveillance policy, defined by the system's administrator, prompts for actions, acknowledgements or device commands such as lockdown or release commands may be presented to the selected guard by the terminal device.

Following detection of the triggering event and the set surveillance policy as defined by the system's administrator, the server automatically alerts a guard on call in step 34. Such guard is selected by the server, subject to information stored and updated within the UID (11a in FIG. 1), associated with the privileges, current assignments and the location of the guard relative to the location of the detected movement. The alert is transmitted to the terminal device of the guard as a wakeup signal or push notification or alternatively, the guard initiates the triggering event by himself by use of the terminal device.

During the triggering event, if the movement of the intruder is tracked by a wide area tracking device such as a radar or any other tracking device, the server may estimate in step 35 the time it will take for the detected intruder to trespass the perimeter of the facility or any other path within or adjacent to the facility. This estimated trespass time takes into account the path and speed of the intruder, as well as the presence of delaying obstacles along the intruder's path. In addition, the server may generate immediate commanding signals to various actuators such as lock-down mechanisms or other alerting means. In sites with narrow perimeter, which may rapidly be traversed by the intruder, such server initiated, immediate zero-delay silent lockdown commands, locking barriers along the expected path of the intruder, may avoid the delay associated with the human assessment stage. The human assessment may take place later, by the terminal device's user interface, prompting the guard, to allow swift dismissal of the lockdown rather than to arm it. This enables the system to generate a timely response that precedes the intruder breaking in, thereby preventing damages.

Such fast lockdown may be selectively activated by the server, subject to surveillance policy defined by the system's administrator to reflect and enforce higher levels of alertness.

Moreover, such server initiated lockdown arm and dismissal commands may be used for situational-control within the facility throughout the interception operation, to gain the guard with further tactical advantage. The monitoring of the locations of guards and intruders and the calculation of their expected paths (described later) may be used by the server, or the guard himself, to initiate selective and timely lockdown arm and dismissal commands through remotely controlled actuators such as magneto-locks or networked locking devices for doors or other remote controlled barriers, such as gates, bollards and the like, capable of blocking the path for either vehicles or walking humans. For example, while the facility is at a partial or full lockdown state, the server may initiate a lockdown-dismissal command for a certain barrier or door, to allow an approaching guard to pass through. Rearming the lockdown of this same barrier or door by the server, immediately after the guard has passed through, can keep the lockdown state of the facility for intruders. In addition, the server may command a lighting device to illuminate the intruder in a way that may allow the guard to approach the intruder while the intruder is dazzled.

These and similar selective and timely arm and dismissal commands can be defined by the system's administrator within the policy settings of the system, as automatic system actions, to be carried out by the server as a reaction to certain events and conditions. Alternatively, such commands can be available to be initiated by guards through the inclusion of prompting controls or as a reaction to special gestures within the user interface of their mobile terminals.

The guard that was alerted may use his terminal device to remotely assess and determine the event's severity in step 36 by observing video data from the selected imaging device that was automatically activated and continuously directed to the location specified by the server to deliver visual tracking of the event, or alternatively by personally commanding operation of one or more of the imaging devices through his terminal device's user interface. If the triggering event was initiated by an animal or an unknowing person such as a hiker, the server is updated, resulting in a termination of the event in step 37. Alternatively, the server may command a video analysis mechanism or other assessment sensor to recognize the source of the movement, to automatically dismiss the alert. In such cases, of false alarms, the immediate lock-down commands or any other automatically generated alerting signals may swiftly be released or dismissed by the guard after assessing the event through his terminal device's user interface. The minimization of the consequences of false alarms and of their dismissal is feasible by relying on the instantaneous threat assessment and the single view of full situational awareness made available by the terminal device's user interface. This allows to boost the security level of the protected site by increasing the allowed rate of false alarms without sacrificing the alertness of the site's security personnel. However, if the guard determines as a result of his assessment that the event is actually a threatening event, an updating message is transmitted to the server in step 38.

If an alarm event is detected, or during a situation where the triggering event was determined by the alerted guard to be a threatening intrusion, the alerted guard himself, or one or more additional guards are dispatched by the server to the location of the detected movement. When a guard is needed to be dispatched, the server first determines the location of each guard on call in step 39 by the location of the corresponding terminal device 12 (FIG. 1) and determines whether the guard is available, capable and qualified to react based on skill level and current assignments, as well as whether the guard is located within the dispatchable proximity, i.e. close enough to arrive at the specified location to catch up with and intercept the intruder. The server then transmits a wakeup signal in step 41 to the terminal devices of the selected guards located within the dispatchable proximity that have a desired capacity or training and sets the corresponding terminal devices to the active mode, whereupon an interception operation ensues in step 43.

Towards dispatching of a guard, OFOV module 18 may assist the guard on setting the right location to deploy to, such that will allow observation of the intruder's expected location and therefore gain the guard a tactical advantage. The expected location of the intruder supplemented or not by the expected trajectory of the intruder and the surrounding vicinity, may be defined by the server, as an area required for coverage. Based on attributes set for the guard like those for an observing sensor, such as height of viewpoint typical of humans and other observation attributes according to specific equipment, as may be available to the guard, the server will be able to generate, in step 44, one or more suggested locations at which the guard may best deploy to, for best observing the intruder's location and its surrounding region as determined by the OFOV information. Similar to the above, the server may calculate and mark the areas observable by the intruder, to allow the guard to circumvent those areas, maintaining tactical advantage during the interception operation.

Moreover, at times, the guard may know that the expected location of the intruder, as was automatically calculated by the system, may not be correct. In such case, the guard may have the option to override and edit the expected location of the intruder by dragging and dropping the indication of the expected location, displayed within the terminal device's geographical display, to a better estimated location.

In order to further support the guard's selection among the various suggested locations to deploy, the server may also calculate and display, in step 44a, the time it will take the guard to get from each suggested location—to an expected location of interception of the intruder as automatically calculated or as optionally overridden and set by the guard. This estimated time will take into account the path and speeds of the guard and the intruder, as well as the presence of delaying obstacles along their paths.

During the interception operation, the server transmits surveillance data related to the intrusion location to all dispatched guards in step 45, and also may assist in directing the additional guards to the specified location. The default surveillance data received by the guards during an interception operation is the surveillance data generated by the surveillance device that provides the server-determined optimal coverage for the instantaneous location of the intruder. Each guard may use his terminal device's user interface to request to receive surveillance data generated by another surveillance device in step 47, in order to increase his knowledge concerning the topography of the terrain or the presence of structural or other obstructing elements in the vicinity of the intruder's current location. If the intruder's current location is not sufficiently visible, due to night-time, smoke, dust or any other cause of poor illumination, the guard may use his terminal device's user interface to request to activate an infrared imaging surveillance device or any other alternative type of sensing device.

A tracking device or a plurality of tracking devices such as radar or video analytics, located within scanning range of the intrusion location or of the instantaneous location of the intruder is in constant operation, to alert upon detection of movements, to provide tracking information of the intruder's whereabouts. Such tracking information may be used by the server to direct the imaging devices or switch among imaging signals from a plurality of imaging devices to provide continuous visual tracking of the intruder. The surveillance data transmitted to each guard therefore may provide an uninterrupted visual assessment of the intruder, being displayed by the terminal device, as a simulated real-time trail superimposed on a 3D model, aerial photograph or a map of the facility. Each guard is able to toggle his terminal device during the interception operation in step 49 between the geographical mode in order to display the intruder's advancement as provided by the radar device and the imaging mode in order to display live video information of the area surrounding the intruder's real-time location. For example, a guard may initiate the imaging mode by positioning his terminal device in a vertical orientation, or by performing any other predetermined motion. It will be appreciated, however, that a guard will be unable to initiate the imaging mode by performing the predetermined motion when he is not involved in an interception operation.

Alternatively, the terminal device may display a mixed split screen mode displaying both the geographical and imaging modes simultaneously.

When operating in the imaging mode, the terminal device is able to superimpose in step 50 graphic information regarding the intruder's real time location generated by a radar or any other detection or tracking device onto real world visible information captured by an imaging device. The real time location of the intruder will be displayed by the terminal device, in a 3-dimensional (3D) augmented reality mode, as captured from the viewing angle of the corresponding imaging device. By imposing the imaging device's location and viewing angle as the perspective of the 3D display, the 3D geographical display is forced to be unified with the perspective of the image, as captured by this same imaging device. This may enable the guard to better correlate the information captured by the detection devices with information captured by an imaging device, or to correlate information received in the geographical and imaging modes. The augmented reality mode is initiated by the guard by manipulating the user interface 23 of terminal device 12 (FIG. 1), and is quite beneficial when the terminal device screen has limited display resolution.

As will be shown in FIG. 4 through FIG. 7, the terminal device may combine and unify the spatial view of the geographical display with the highly visually detailed view of the video display. Such unification will require correct association between the displayed objects from the geographical and imaging views.

Figure 4:
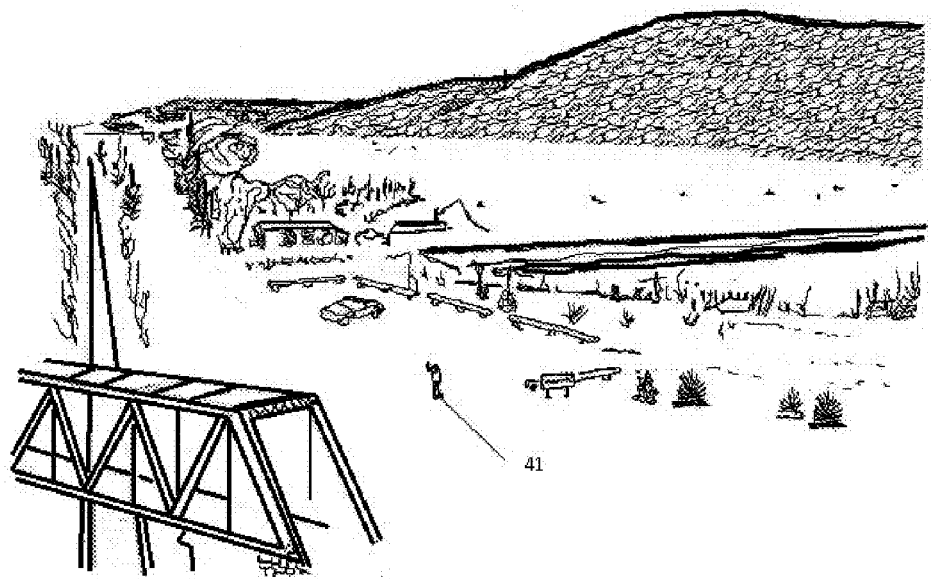
FIG. 4 is an illustration of the View of the field from the imaging device's location, according to one embodiment of the invention.

FIG. 4 illustrates the field from the viewpoint of a deployed imaging device. If an intruder 41, is detected in the field by a detection device or marked by one of the system's users, either a guard or a scout, the imaging device, provided it is the one selected by the server, will be slewed to the intruder's location to capture a detailed view of the intruder to allow its assessment.

Figure 5:
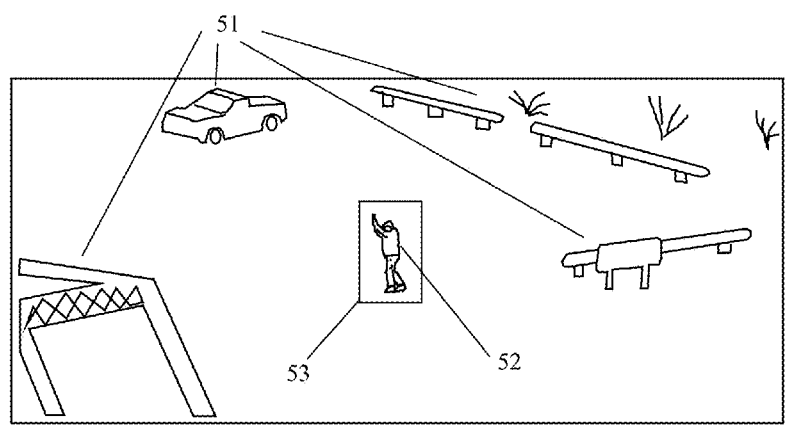
FIG. 5 is an illustration of the Image captured by imaging device, according to one embodiment of the invention.

FIG. 5 shows the image as captured by the imaging device. Due to the imaging device's position in the field, this image may contain many other objects, scattered in the field, that fall within the imaging device's field of view 51. This makes the visual image much broader in context, relative to the assessed threat. In order to allow the association of the intruder's captured image with its location, as reflected in the geographical display, the intruder's FIG. 52 has to be narrowed or cropped from the entire captured video image. This will omit the other scattered objects from the captured image.

According to one embodiment of the current invention, such cropping may be performed by a video analytics mechanism that analyzes the video signal in real time. This mechanism will locate the area within the captured visual image plane, which encompasses the figure of the moving threat. The video analytics mechanism will also emphasize the detected threat from the image plane by outlining a rectangular pattern around the threat's FIG. 53. Such rectangular pattern may be utilized to crop the video image, omitting the other objects that fell within the imaging device's field of view.

According to another embodiment of the current invention, cropping of the video image may be performed by the terminal device's processor with no image analysis mechanism, but rather by a direct derivation of the detected or expected position of the intruder within the video image plane. This calculation is based on the following data; (1) the location of the detected intruder—as reported by the detection sensor. (2) The location of the deployed imaging device. (3) The observation angles of the imaging device—as reported by its Pan, Tilt and Zoom (PTZ) motors. Such direct derivation of image cropping, may be considerably lower in terms of required computational intensity, compared to a typical video analytics and image analysis mechanisms, allowing it to be processed in real time by the limited processor of the mobile terminal. Alternatively, it may be performed at the processing node 6 or at the server.

The calculation of image cropping may be prone to errors due to misalignments and inaccuracies in measured and reported values from the detection sensors, as well as from the imaging device's motors. Those errors may appear in the form of misalignments and offsets of the displayed intruder's figure away from the center of the cropped visual image. The further "zoom-in" effect produced by the cropping mechanism, intensify such misalignments even further to the misalignments caused by regular Pan, Tilt and Zoom commands delivered to the imaging device's motors. In addition, image cropping may be separately performed to generate multiple cropped images in case the imaging device's field of view encompasses two or more separate indicated intruders, a case in which a Pan, Tilt and Zoom command may not be able to zoom-in on both intruders simultaneously. Such offset may be compensated by simple visual offsetting controls, used by the user to center back the intruder's figure within the cropped video image. This offset data shall be reported to the server and stored in the SDD (11 in FIG. 1) to enable it to be maintained and persisted by all the terminal devices along the whole duration of the visual tracking of this intruder and of other intruders traversing the same area while being tracked by this same imaging device. Moreover, processing of such image cropping by the mobile device, allows to maintain double views of both full frame and the cropped image with almost no further computations.

Figure 6:
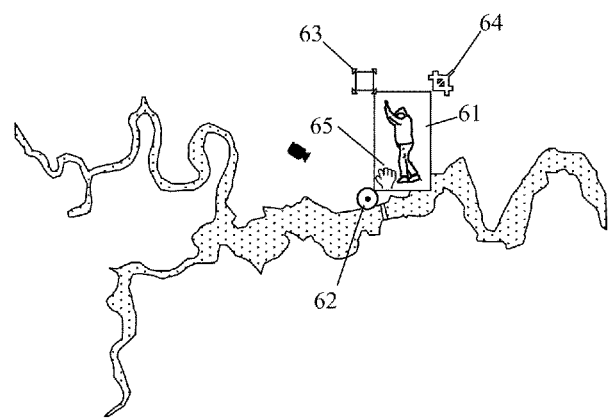
FIG. 6 is an illustration of the 2D geographical view of the field, according to one embodiment of the invention.

FIG. 6 shows that after the visual image is correctly cropped to primarily contain the figure of the intruder, it may be embedded within the terminal device's geographical display 61, adjacent to the indicated threat's location 62. Such embedded detailed visual display, concentrated only on the intruder and attached to its geographical indication, will deliver the user an easily associated geographical and visual views of the intruder.

According to another embodiment of the current invention, further graphical user interface controls may be attached to the embedded cropped visual image of the intruder within the terminal device's display. A size control 63 will allow the user to set the size of the embedded visual display within the whole geographical display. An additional crop control 64 will enable the user to control the cropping mechanism, so a wider or a narrower views may be derived from the original captured visual image. Another additional offset control 65 will enable the user to correct for misalignments of the intruder's figure not displayed at the center of the cropped image.

Figure 7:
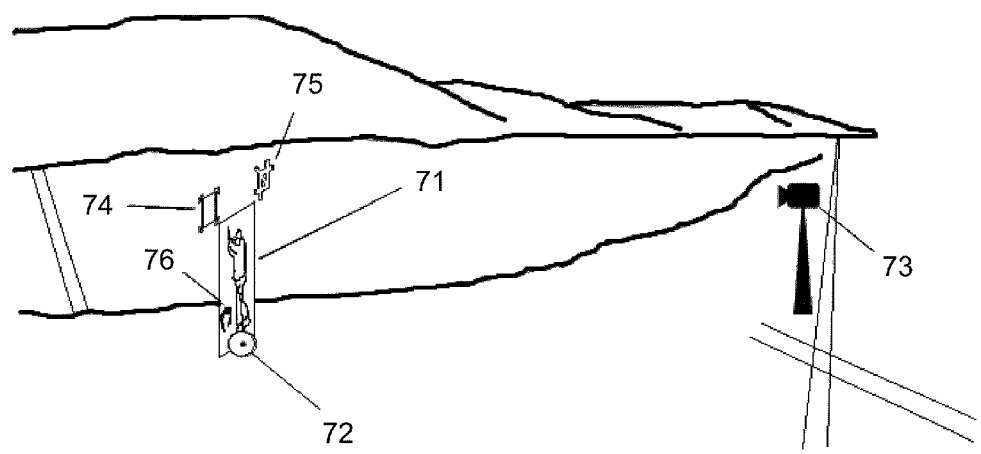
FIG. 7 is an illustration of the 3D geographical view of the field, according to one embodiment of the invention.

According to another embodiment of the current invention, as shown in FIG. 7, when a 3D geographical display mode is employed, further orientation cues may be communicated to the user by the terminal device. In such 3D display, the cropped visual image of the intruder 71 shall be displayed adjacent to the geographical indicator of the intruder's location 72 and projected from the actual location of the imaging device 73. Such projection of the cropped image, shall maintain and reflect the true viewpoint of the intruder from the location of the imaging device, matching the perspective embodied within the captured visual image. By this, the user shall be presented with a display of the situation in the field, decorated with the true spatial and perspective attributes of the captured image, boosting the whole realism of the display. Alternatively, all images, overlaid on the geographical display, may be oriented towards the perspective of the guard's view, to allow the guard to observe a full aspect and a constant frontal observation of the overlaid video display. Such unification of both the views of the intruder, while maintaining the orientation and context of the displays, shall support and aid the user's process of data-fusion.

According to another embodiment of the current invention, the graphical user interface controls, of size 74, cropping 75 and offsetting 76 of the embedded image (as used in the 2D display mode), shall be operable while preserving the 3D projection perspective of the cropped image.

According to another embodiment of the current invention, in case the imaging device's field of view covers more than a single detected intruder or activity, those additional images may also be cropped from the captured image and embedded at the same time within the geographical display.

In the absence of an indication of the location of a detected or a notified event, the visual image of an intruder or any other observed object, cannot be cropped from the originally captured image by the imaging device. Within narrower sites, such as within indoor environments, urban sites or any other narrow area, it may be beneficial that the terminal device will unify and overlay the original image within the geographical display without being further cropped. The exact location within the geographical display, on which the captured image shall be overlaid upon, may be the instantaneous location, the imaging device is pointing on, as calculated from the 3D model of the terrain, structures and other objects within the site, as well as from the imaging device's geographical location and it's orientation as reported from its Pan, Tilt and Zoom (PTZ) motors or as registered in the SDD during the installation of a fixed imaging device, with no PTZ motors. This will allow real-time live visual information to be overlaid on the location covered by the corresponding imaging device.

Such overlay of a plurality of images from the corresponding plurality of fixed imaging devices on a geographical display allows a live real-time situational overview of the site. For example a display of a floorplan base map, with live images, captured by fixed cameras installed within the various rooms and halls of a building and overlaid on the floorplan map, delivers a live representation of the whole building's floor.

Figure 8:
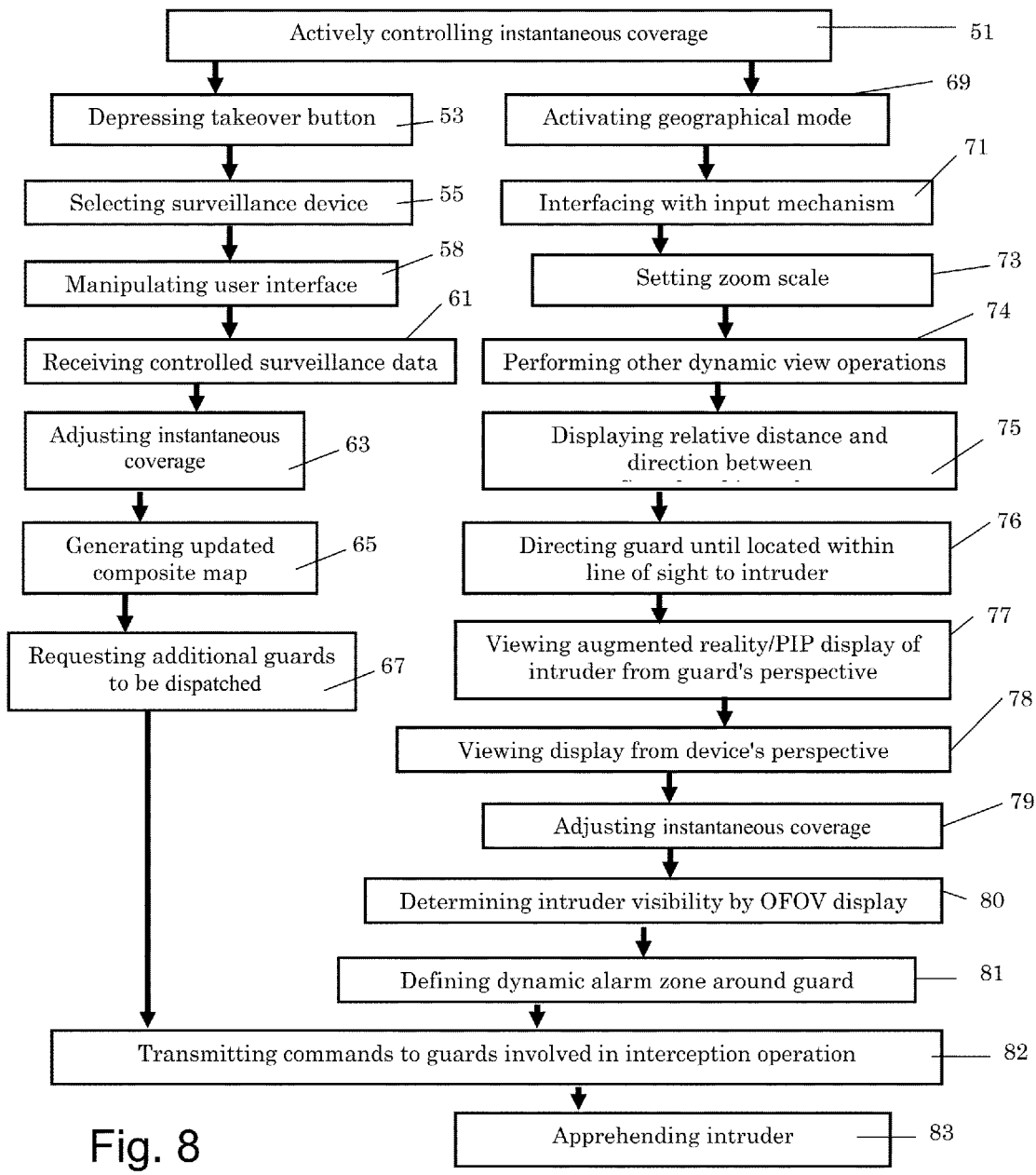
FIG. 8 is a method for actively controlling an instantaneous coverage during course of an interception operation.

As shown in FIG. 8, a dispatched guard is able to use the terminal device's user interface to actively control the instantaneous coverage in step 51 of one or more surveillance devices during assessment of the triggering event or during an interception operation.

In one embodiment, the disposition of one or more surveillance devices may be remotely adjusted during an interception operation. When the terminal device of a given guard is in the imaging mode, or in unified display mode, a take-over button or other user interface element of the terminal device is used in step 53. After the take-over is performed and a specific surveillance device is selected in step 55, the guard is able to control the positioning of the selected surveillance device. Such a guard will be referred to hereinafter as the "initiating guard".

During the take-over mode, the initiating guard is presented with a user interface via his terminal device. When the initiating guard manipulates the user interface in step 58, the user interface provides feedback in step 61, including an indication of the current disposition of the controlled surveillance device, the sector of the facility which is being currently scanned, live scanning data, and what other taking over options are available to the initiating guard.

The type of surveillance device that is most likely to be taken over is a video camera. The initiating guard is able to view on the terminal device display the images that the surveillance device is currently capturing, at the selected instantaneous coverage. If the initiating guard did not receive sufficiently valuable information at the selected instantaneous coverage, the initiating guard changes the instantaneous coverage in step 63 such as by selecting a different angle, if the user interface allows such a change in surveillance device disposition according to the limitations of the joint by which forces are transmitted to the surveillance device for changing the scanning angle. After the instantaneous coverage of a surveillance device has been changed, the server generates an updated composite map in step 65 for indicating all instantaneous OFOV locations and all instantaneous unscanned areas within the facility.

Other types of surveillance devices that may be taken over by an initiating guard include a projector for illuminating a given sector of the facility and a microphone or any other controlled device with sectorial coverage.

When one or more guards are involved in an interception operation, accurate information regarding the real-time location of an intruder may be of a critical nature. For example, the intruder may be hidden at a location that is not clearly seen by the closest surveillance device, or, in a more hazardous situation, a large number of intruders may have entered the facility as a result of a fence cutting action even though the surveillance device detected only one intruder. During such situations, the server is unable to forewarn a dispatched guard concerning the imminent danger to which he is exposed.

In order to properly assess the danger level of the interception operation and to determine whether additional guards should be dispatched, the initiating guard reviews the scanned information and determines whether further actions are necessary. One action may be to further change the instantaneous coverage. Another action may be informing his commander, or alternatively his colleagues, in step 67 that additional guards should be dispatched. Once the instantaneous coverage of a surveillance device has been changed by the initiating guard, all other guards receive on their terminal devices the same instantaneous coverage indications and surveillance data generated by the controlled surveillance device. The other guards, subject to their authorized privileges, with the exception of the commander, are indicated that they are unable to change the instantaneous coverage set by the initiating guard during the course of an interception operation. Other guards may use their mobile terminals' user interface to take over other surveillance devices, however, and the first guard to take over another surveillance device will be considered the initiating guard for that surveillance device.

An initiating guard who can directly observe the intruder, can utilize his mobile terminal's GPS or other indoor or outdoor positioning system and orientation sensors to point, mark and track the location of the threatening intruder. Spatial pointing is based on the geographical location of the mobile terminal as derived by its positioning system and orientation of the device, as held by the user. Such orientation may be expressed by the azimuth angle relative to the north and by the elevation angle of the held device relative to the horizon. In order to maintain an accurate measurements of azimuth angle, the true north may be derived by the device's processor from consecutive readings of the device's positioning system to generate an accurate estimation of the distance and direction between the locations of these readings and to establish a correcting offset to the continuous azimuth measurements as read from an attached or on board electronic compass. In addition, the mobile terminal's processor may use the built in camera and microphone to attach visual and/or audio descriptions to the marked intruder. A crosshair displayed at the center of a displayed image, as captured by the mobile terminal's built in camera, may further help the user to precisely point the held device towards the indicated threat. Spatial marking and multi-modal description of threats allows field guards and scouts to collaborate, avoiding awkward spoken mediation of situational awareness, hence expediting and simplifying exchange of assignments. In addition, unobtrusive supervision is enabled, as well as information exchange with remote operators.

In another embodiment, a dispatched guard during an interception operation is able to determine the current location of the intruder. The detection device, after the geographical mode has been requested in step 69, or in the unified display mode, provides the dynamic location of an intruder, or of intruders if more than one intruder has illegally entered the confines of the facility, in the form of a real-time trail, when a terminal device is set to the geographical or unified mode.

The system automatically controls a selected imaging device to visually track the intruder. Visual tracking is driven by periodic updates of the instantaneous location of the tracked intruder, received from the detecting or tracking sensor. In prior art systems, such updating data is used to calculate and set the next spot towards which the imaging device shall be slewed, so a continuous video image of the intruder may be captured and displayed. This mode of operation, trying to follow the intruder's movement along discrete time intervals by directing the imaging device to repeatedly updated locations, drives the imaging device's pan, tilt and zoom motors to abruptly accelerate from the current position of the device and decelerate towards the next position. Such command and control of the imaging device produces shaky video signals and fragmented tracking of the intruder. In another embodiment of the current invention, the movement of the intruder is smoothly tracked by estimating the velocity and direction of travel of the intruder and calculating corresponding scan commands for the imaging device. Such server initiated scan commands, set the imaging device's pan, tilt and zoom motors to move at certain speeds, rather than positions, avoiding the motors to abruptly accelerate and decelerate while jumping between consecutive positions. In addition, the imaging device, commanded by repeatedly updating scan commands, maintains a continuous follow-up after the actual smooth and continuous changes of the instantaneous location of the intruder, as long as its velocity is properly estimated. This, improved repetitive scan based command, maintains smooth visual tracking of the intruder with the benefit of finer feedbacks to constantly correct for the actual movement of the intruder, effectively maintaining the intruder within the instantaneous coverage of the imaging device and reducing the wear of the controlled pan, tilt and zoom motors.

Prior art observation devices, which are automatically controlled by command and control systems to generate a trail of the intruder, will generally, be unable to assist a guard in being directed to a real-time location of the intruder due to the relatively large default scale that is generated. The inability to pinpoint the exact location of a moving intruder is exacerbated by the need to perform manual movements by means of a joystick or other control switches in order to periodically interrupt the automatic tracking operation and to then adjust the zoom scale of the generated intruder trail.

While the zoom scale of prior art imaging devices can be adjusted only when operating in a manual mode, and not while automatically tracking, guards accessing an imaging device in the present invention are advantageously able to adjust the field of view while the system automatically tracks the intruder. A guard wishing to intercept the intruder who is unable to determine the exact location of the intruder, interfaces in step 71 with a slider or with any other input mechanism of the terminal device in order to suitably set a zoom scale parameter of the tracking imaging device in step 73 in order to pinpoint the intruder's location while the imaging device is automatically tracking the detected intruder. In addition to being able to narrow the field of view, the guard may also widen the field of view, depending on a stage of the interception operation or on the resulting actual field of view around the intruder's location. These settings may be stored with the configuration information so that each guard may obtain views suitable to their personal configuration preferences. An instantaneous location of the intruder may be more accurately perceived in the geographical mode in step 74 by performing other operations as well, such as a pan operation or a tilt operation while using the user interface of the terminal device.

During the interception operation, in order to direct guards on the move to the location of the intruder, each terminal device displays in step 75 the relative distance and direction between the location of the corresponding guard, as determined by the terminal device's indoor or outdoor positioning receiver, and the instantaneous location of the detected intruder, as measured by the surveillance devices or indicated by a scout. Such relative location information can be displayed on the guard's terminal device in the form of a compass, or in any other suitable way to allow the guard to be oriented instantly, especially while maneuvering.

The terminal device will help navigate the guard through various pathways within the facility in a way similar to GPS based navigation services in step 76. A plurality of destinations may be proposed to the guard, including the actual location or expected location of the tracked intruder and locations from which the guard will have an unobstructed line of sight to allow observation of the intruder's location, or otherwise gain tactical advantage for the benefit of the guard. Such tactical advantage reflects the capability of the guard to more easily apprehend the intruder and may include considerations associated with the direction of approach towards the intruder relative to the current or expected direction of the sun or any other prominent lighting source in the field, capable of dazzling the intruder, or allowing the guard to approach towards the intruder from a higher location due to terrain attributes, or from a distance that bears advantage, based on special equipment available for the guard, such as night vision, binoculars, long range arms, or any other type of equipment extending the guard's effective range of operation, or from a direction, which is expected to allow the guard to approach the intruder from behind, or to have backup in the form of another guard nearby, or through improving the guard's tactical advantage by certain combinations of selective and timely lockdown arm and dismissal commands (as described above). The tactical advantage information may be summarized by the system as a set of "tactical advantage metrics" associated with each pair of points (guard and intruder), and may be stored in a memory of the server. For example, a tactical advantage metric may be low, indicating little or no tactical advantage, or it may be high, indicating a greater tactical advantage. Alternatively, several locations and/or routes that reflect distinctive aspects of tactical advantage may all be simultaneously displayed to the guard trough different color coding or any other way of coding to allow the guard, the operator or any other user, according to system privileges, to select the preferred aspect of tactical advantage that fits the specific situation at hand.

Another aspect of tactical advantage may include hidden routes to the intended locations of dispatch, through which the intruder's observability of the guard is minimized. Such observability is calculated by the server or the mobile terminal, combining the time and waypoint information of the guard and intruders projected paths with OFOV analysis between each of these pairs of points, and the guards projected path is selected using the path and velocities that minimize the observability of the guard by any intruder. The expected locations of the intruder during the guard's way to the location of dispatch or by point to point line of sight analysis between temporal respective locations of the guard and the intruder along their expected trajectories. These destinations may be displayed within the terminal device's user interface with the corresponding calculated time of travel to the expected location of interception. The server will update the proposed navigation paths, velocities, and times for interception while the guard and intruder are maneuvering within the field, while the server sends real time instructions to the guard in order (e.g. move faster, slow down, stop, turn left) to maintain the above described tactical advantage. The pathways along which the server directs guard are based on the geographical mapping data loaded to the system by MID 19 (FIG. 1) or defined by the system's operational administrator during system setup.

The processor of the server implements the following algorithm while calculating the tactical advantages of the guard and the subsequent monitoring of the interception of an intruder by one or more guards.

Calculation

1. Project possible and probable paths (in time and space) of each of the intruders. This projection produces a graph of projected points and connections, associated with time and locations. The path through the graph may be probability weighted based to assign a likelihood of that path being traversed by an intruder.
2. Select a set of guards based upon their known characteristics, including distance to the intruder, capability, availability, and other factors. Calculate interception paths and points for each guard by combining permitted routes of travel, time and distance information, and at least one tactical advantage metric (described above). These interception paths and points are represented as set of graphs connecting points associated with specific time and locations.
3. Screen the paths using a threshold for at least one of the metrics in order to eliminate paths that will cause the guard to lose tactical advantage. For example, guard paths for which there is a high probability of the guard being observed by the intruder are removed from the graph (e.g. removed from consideration) in this step. This screening may occur based upon any single or set of metrics associated with the guard, attributes of the guard (such as movement speed or capabilities), and/or the time/location of the guard and/or the intruder(s). In the case of multiple intruders, this calculation is performed for each guard/intruder pair in order to eliminate paths by which a guard is hidden from a first intruder and is directly exposed to a second intruder.
4. Optionally, the server can determine the existence of remotely controllable barriers or door-locks along potential paths of intruders and guards, which may be commanded to block or unblock such available paths.
5. For each guard, select a set of paths that maximize the tactical advantage metric scores while traversing the graph. Again, if there are multiple intruders, maximize the set of tactical advantage scores.
6. Select the guard or guards to dispatch in order to intercept the intruder based upon the results of steps 1-4.
7. Transmit to the selected guard(s), the steps and paths selected. This transmission includes:
  a. The paths and point (e.g., graph information) of other selected guards and intruders as projected from the receiving guard's point of view. This information may include the tactical advantage score for each point on the graph (or may include one or more components that make up the tactical advantage score, such as observability [based upon OFOV score].
  b. Situational awareness information, including the current and projected location(s) of guards, intruders, and other objects of interest to the guard.
  c. Instructions to the guard.
8. Optionally, the server may transmit commands through the network to remotely controllable barriers or door-locks, deployed along the paths of intruders and guards to block undesired paths and to unblock and clear for passage desired paths, maximizing the tactical advantage of the guards. Based on system preference, the server may transmit these commands either in advance or just in time—as the intruders and guards are traversing the facility, While the intercept is in progress, the system monitors each of the selected guards and intruders and compares their current location against the previously calculated (and stored) graph information. Based upon the updated information, new paths are added to the graphs and no longer possible paths are removed. If there is a substantial deviation from the projected graph by an intruder or guard (e.g. an intruder stops for an extended period and the projected tactical advantage information is no longer current and/or available for the new time/location pairs) or when a new path is added to the graph, the system recalculates the paths and tactical advantage metrics associated with each of the remaining paths using the techniques described above.

After the dispatched guard has approached the intruder, extreme awareness and orientation is needed. The terminal device, when operating in the geographical or unified mode, can be enhanced so as to display the given area in which the intruder has been found, in the form of 3D augmented reality in step 77, as seen from the perspective of the guard and the orientation of the terminal device. Such augmented reality display may be derived by the terminal device, based on the guard's location as measured by the mobile terminal's indoor or outdoor positioning receiver and the orientation may be derived from the way the guard holds the mobile terminal, pointing with it to a point of interest within the field, as will be described hereinafter. The location and orientation of the held device will set the area surrounding the above point of interest, allowing the mobile device to process and display the actual portion of the spatial 3D model of the site and to set the most relevant real time information to be fetched from the server and streamed from the relevant imaging devices and overlaid on the geographical display. In addition, selective resolutions of real time OFOV analyses, performed by the mobile device, may be adapted to the displayed area of interest as well. The location of the detected intruders may also be displayed in the form of Picture in Picture (PIP) while viewing the given area, to allow the guard to quickly apprehend the intruder. Such augmented reality display mode may be activated either by the user or as a result from the guard reaching a location close to the intruder's location or as a result from the user's gesture—raising the mobile terminal to point on a certain location within the area surrounding the intruder. In step 78, a 3D augmented reality display may also be blended by the terminal device within the imaging mode, but from the perspective of the location and viewing angles of the imaging device that generates the video image. The dispatched guard relying on such an augmented reality display may adjust in step 79 the disposition of an imaging device, or of any surveillance device, to actively control its instantaneous coverage by means of the user interface of the terminal device, for example by touch inputs, or by means of encoding the spatial orientation of the held mobile device to provide the guard with even more observation perspectives of the intruder.

While prior art desktop systems for manned control centers employ visually appealing, 3D display capabilities, the system of the present invention may provide an adjustable 3D augmented reality display that may be generated from either the guard's perspective, or another preferred location, derived from the guard's location, such as a higher position that might deliver further tactical advantage, or from the imaging device's perspective to constitute a significant operational advantage by virtue of the flexibility afforded to the guard in terms of locating and viewing the intruder. In the unified mode, the above 3D display, from the guard's perspective, shall be combined by the terminal device, with the visual detailed view of the intruder, in a way that communicates the imaging device's perspective (as explained above). Such combined display, shall build a fused image maintaining true perspectives of all the data and images collected from the intruder's location and its vicinity. Alternatively, all images, overlaid on the geographical display, may be oriented by the terminal device, towards the location of the guard, to allow a full aspect and a constant frontal observation angle by the guard.

While maneuvering within the facility, the guard may not be able to physically observe the intruder due to concealing objects within the facility such as structures, walls and the like. This may be of a serious challenge to the guard, especially in the absence of accurate indication of the location of the intruder, such as in areas, insufficiently covered by detection and tracking devices. The inclusion of a 3D model of the facility's structures may reproduce such concealment within the terminal device's augmented reality display as explained above. To aid the guard in such cases, the mobile terminal's augmented reality display shall allow the guard to set a desired level of transparency to the 3D model of the facility's structures and objects. This may enable the guard to observe surveillance information, as overlaid within the geographical display, at a location, representative to their actual location. Such capability of the terminal device, enabling the guard to see live surveillance information, although being concealed behind elements of the site's structures and other objects, imitates the capability of "seeing though the walls". This even further enhances the tactical advantage of the guard, being able to observe the intruder while the intruder cannot observe the guard.

Before coming to a decision, the terminal device may include within its geographical display OFOV information, at any stage of the interception operation in step 80, and also during the preliminary assessment stage, regarding the surveillance devices that are currently providing scanned data to determine whether the scanned data being received is reliable. The terminal device may also include within its geographical display a line of site indicator or OFOV information for the guard's current position and the current orientation of his terminal device, and/or for a given position of any other guard, with respect to the instantaneous position of the intruder, to determine whether the intruder is observable, and/or for the intruder's location, to determine areas observable by the intruder, taking into account the topographical or structural data supplied by MID 19 (FIG. 1).

At times a guard may not be aware that he is being approached by an intruder and that he is in danger, for example during a complex interception operation involving more than a single intruder while the guard is concentrating on the interception of another intruder, or during a situation when the guard has lost his orientation. To assist a guard in such a situation, the server may define a dynamic alarm zone around the instantaneous location of the guard in step 81, which is identified by the indoor or outdoor positioning receiver of the guard's terminal device. The dynamic alarm zone will be generated at a predetermined area surrounding the instantaneous position of guard, e.g. within a radius of 10 meters, regardless of whether the guard is stationary or in transit. The server will alert the guard by an alarm, which may be accompanied by an indication of the direction of approach and by other voice or multimedia information, if a dangerous detected intruder has been found to enter this alarm zone. An alarm will not be generated or another type of notification may be generated if another guard has entered this dynamic alarm zone.

While the guards are receiving real-time information regarding the location of the intruder, the guards can use their terminal devices to exchange commands and directions in step 82 between the corresponding terminal devices of each guard involved in the interception operation regardless of the mode of operation to which the terminal device is set. Commands or directions are usually in the form of voice or multimedia commands that are transmitted over the normal communication channel, but also may be transmitted as a textual message, e.g. SMS or e-mail message or as geographical notification through the pointing capability of the mobile terminal. The guards may coordinate where to be positioned and when to fire or when to advance, as practiced in the field of security, until the intruder is apprehended in step 83.

Alternatively, the commands or directional information may be transmitted by a commander.

Through the augmented reality display, the terminal device may present the guard with the location of other guards as measured by the positioning systems embedded within the mobile terminals held by the other guards and reported to the server, which fall within the area in front of him, as indicated by the orientation of the mobile terminal held or worn by the guard. This allows the guard to be aware of any friendly personnel deployed at the area in front of him, even though the friendly personnel may be concealed by the facility's structure or walls or any other object, due to the capability to be set as transparent within the guard's augmented reality display. Such awareness of friendly personnel in front of any guard, may help avoiding friendly crossfire between the guards.

For example, such situation of potential crossfire with the friendly guard may be indicated by a distinct icon, positioned within the augmented reality display to represent the actual location of the friendly guard. Alternatively, a more general indication may be used by the terminal device, setting an alarming color to the background of the augmented reality display or a portion of the display. In addition, such hazardous situation may be further indicated by the terminal device through an audible alert with or without the information concerning the friendly guard.

Figure 9:
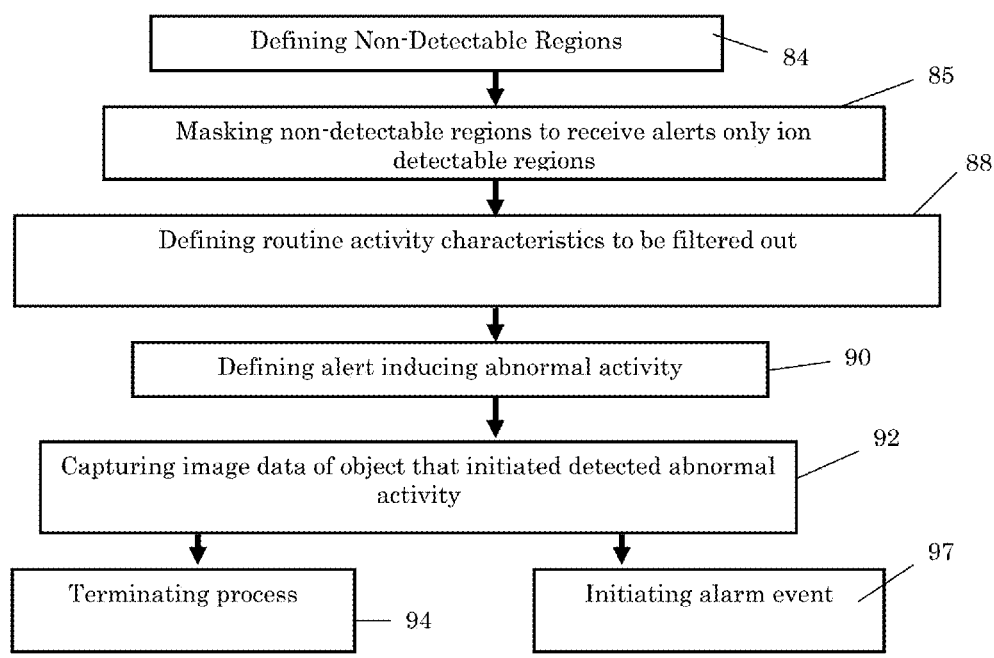
FIG. 9 is a method for masking non-detectable regions.

In the embodiment shown in FIG. 9, alerts from a detection device are pushed by the server to the terminal devices only in predetermined detectable regions while detecting movement indicative of a triggering event or of an alarm event.

The operational administrator of the system first defines in step 84 those regions within the facility that are considered to be non-detectable regions, enabling initiation of detected events by the server only in the detectable regions in step 85 by masking the defined non-detectable regions.

A region routinely traversed by vehicles, people or animals is considered to be "non-detectable" since a detection device will generate nuisance alarms due to regular legitimate traffic. Examples of non-detectable regions include a main road within the facility which is regularly traversed by vehicles, a sidewalk along which workers of the facility walk to their place of work, and a field or operational area within which workers are in transit on a regular basis.

At times an intruder may attempt malevolent activity within a non-detectable region. Even though the non-detectable region is masked, the system is nevertheless able to detect an action that is indicative of a broader activity being performed in the non-detectable region—e.g. a vehicle slowing or stopping on the road prior to intruders getting off from. Such detection is made possible by defining in step 88 and storing in the server's memory characteristics that are typical of routine activity normally carried out in the non-detectable region, for example the passage of vehicles travelling at a predetermined range of speeds along a given road, allowing such routine activity to be filtered out by the server's processor.

Abnormal activity, deviating from routine traffic, e.g. excessively slow or suddenly stopping vehicle movement or vehicle movement crossing the given road is then defined in step 90 to enable the server to determine whether detected unusual activity is indicative of such abnormal activity. If abnormal activity has been detected, the server initiates a triggering event and the server may also slew an imaging device to the location of the object that initiated the abnormal activity in step 92. If either the server or an alerted guard conclusively determines that the initiated abnormal activity is not indicative of hostile activity, the server will terminate the process in step 94. However, if it is determined that a threat is evolving, the server initiates an alarm event in step 97 to dispatch the previously alerted guard or one or more additional guards that are on call.

In addition to being able to outline an alarm or mask zone by a polygon, the operational administrator may also outline the path of a road on a geographical mode display by a simple polyline representation, in order to filter out legitimate traffic. Such a polyline based definition, done through a collection of points defined as vertices with segments of straight or curved lines stretching between them, allows the server to derive a directional orientation information of each segment of the road as opposed to a polygon based definition of a zone. This implicitly define the direction of the legitimate traffic to be ignored within each section of the polyline. The filtering of legitimate traffic is made possible by the server, comparing the orientation of the polyline's section along which movement was detected with the direction of travel detected by a tracking device. Such orientation analysis shall allow the system to alert on road crossing events, which may also indicate broader activity. An additional width parameter may be added in order to enable the server to apply masked zone characteristics to a given road by defining the area around the outlined polyline within which such filtering is made.

The system administrator is able to define surveillance policies for the server through scheduled system modes, comprising various filtering criteria such as alarm zones, masking zones and roads, as well as other types of event filtering. These definitions are accompanied by sets of actions to take place as a reaction to certain events or occurrences. Such actions may include system-actions to be automatically executed by the server and user-actions that prompt the guard to perform, just-in-time, through the mobile terminal's user interface. For example the administrator may define a rule according which, a crossing of a certain alarm zone, would require the guard's consideration in real time and therefore define a user action by setting a prompting user interface visual control object to appear, just in time, within the mobile terminal of the corresponding guard. This visual control object will direct the guard to assess the event and prompt him to take a decision whether it is necessary to generate a lock-down command to block a specified door or passage near the alarm zone or not. Alternatively, the administrator may think that there is not enough time for human assessment and therefore, define a system-action that causes the server, upon such an event, to automatically send the lock-down command signal to block the door without any delay. The administrator may add an additional user-action through another prompting visual user interface control, to direct the guard to decide whether to dismiss the lock-down or keep the door or passage blocked.

In addition, the system administrator may define the server's reactions that set the way a field guard will collaborate with a remote operator—monitoring the secured facility within a command center and/or a supervisor or commander either situated in the field or at the command center or elsewhere.

Such server definitions, setting the collaboration policies may be carried out through the following selected levels of involvement of the remote operator and/or commander or supervisor:

Autonomous: The least level of remote involvement would set the server to be completely autonomous to automatically rank and select items within the operation of the site's security. Such rankings may include the various alerts through a severity scale, ranking of the various locations and routes of dispatch according to the calculated tactical advantage metrics (as explained above) and the like. Within such policy level, the server's processor will automatically select, or will prompt the guard to make autonomous decisions independently of the operator and/or supervisor.

Notified: The next level of remote involvement defined by the administrator, would set the server's processor to send notifications to the remote operator or commander upon each ranking and selection performed by the server or each action selection, which the server prompts the guard to select, in order to keep the remote operator or commander informed as to the progress of the field operations and the associated decisions that were taken.

Supervised: A further higher level of involvement defined by the administrator, would set the server's processor to send an acknowledgement request per each ranking and selection, requiring the review and acknowledgement of the items' ranking and selections by the remote operator or commander to include their discretion within the field operation.

Mastered: The highest level of involvement defined by the administrator would set the server's processor to refrain from any ranking and selection, sending them to the appropriate terminal devices to be performed manually by the remote operator or commander, and reverting back to the way prior art systems are handling field operations.

Such policies of levels of involvement may be set separately per each stage within the intruder interception operations (as explained hereinafter).

According to another embodiment of the current invention, an interception operation is conducted by the server through a structured process including the following stages:
1. Routine—the server monitors the available sensors while the mobile terminals, carried by guards on call, are in sleep mode. Detections and notifications are tested by the server's processor, to verify if filtering conditions, as defined by the system's administrator, are met before an alert is initiated. Other routine activities may be conducted as explained above.
2. Alert—Once the server's processor determines that a filtering condition is met, the server's processor selects the best guard to respond and pushes a notification through the data network to the mobile terminal of the selected guard and/or to the operator's workstation.
3. Assess—The terminal device, used by the guard/operator presents a full situational awareness image of the location of the notified event, including its visuals, to facilitate a swift decision by the guard about the severity of the alert.
4. Dispatch—In case the event is considered to be a threatening one, the terminal device displays the user with a set of dispatch locations that the server has calculated, which hold tactical advantage over the intruder to select from.
5. Route—Once a dispatch location is selected, the terminal device displays the guard with various routes the server has calculated, to reach the selected location of dispatch, which maintain tactical advantage over the intruder. Once a route is selected, the mobile terminal will navigate the guard to the location of dispatch while displaying the direction and distance from the intruder's location, maintaining the guard's orientation.
6. Intercept—Once the mobile terminal senses that the guard has arrived at the scene or the location of dispatch, the mobile terminal will report the server and engage into a perspective situational awareness display (as explained above), to allow the guard to maintain his immediate orientation and clearly grasp the current situation.
7. Debrief—In addition to directions, pushed by the server to prompt the guard to act, just-in-time, all events and actions are recorded by the server's processor on a networked database that may be later retrieved or played back to facilitate post mortem analysis.

According to the physical conditions at the site and the event's circumstances, some of the stages may be defined by the system administrator to be conducted implicitly or skipped by the server's processor to allow the interception operation to be streamlined.

The following example illustrates the surveillance policy settings, as may be defined by the system administrator and enforced by the system's server throughout the various operational stages of the interception operation:

A site may be secured by two field guards that are operating by themselves, with no command center involved, during certain times of the day or the week, while during other times, a command center is involved in the security of the site. In such a case, the system administrator can define, within the scheduled system-modes, that during the times on which the guards are supposed to act alone in the field, the server will be configured in a way that an "Autonomous" policy would be defined for the server throughout all the stages of the whole operational flow, and on the other hand, during the times on which the command center is supposed to be involved, another system-mode may be set for the server, which consists of the "Supervised" policy for the "Alert" and "Assessment" stages, and "Notified" policy is defined for the remaining stages of the operational flow.

This way, while the field guards solely secure the site, and an "Autonomous" policy is set for the server, upon every alert, the server will rank and sort the available guards and determine the best guard to deal with the alert, according to either their proximity to the alert's location or any other set of criteria. The server will push an alerting notification to the mobile terminal of the guard that was selected as the best to respond, to allow him to promptly assess the alert. In addition, the administrator may define that the server's processor will perform certain operations and/or prompt the guard to select other actions as a result of such event, for example—tracking the detected intruder by a camera.

Within the "Assessment" stage that follows the notification to the selected guard, the server's processor will further rank and sort all the currently relevant alerts according to a set of severity criteria to allow the guard to browse through them in a descending order of severity. Once the guard selects an alert, the server will advance the operation's state to the "Dispatch" stage, through which the server's processor will calculate a set of dispatch locations for the guard as described above. The "Autonomous" policy setting sets that the server shall rank and sort the calculated dispatch locations according to a set of tactical advantage criteria as described above. The guard's selection of the preferred location of dispatch will signal the server to move the operation's state to the "Route" stage, through which the server's processor will calculate a set of routes to the selected location of dispatch and prompt the guard to select the best route for this selected location. As in the preceding stages, the server's processor will further rank and sort the set of calculated routes according to a set of tactical advantage criteria as described above, so the guard can select his preferred route or just follow the route that was ranked highest by the server. Such selection will cause the server to send the selected route to the guard's mobile terminal that will initiate a navigation session, through which the mobile terminal will direct the guard through the selected route on a turn by turn basis, until the guard has reached the aforementioned dispatch location.

While the "Autonomous" policy sets the server to rank, sort and select the various variables throughout the operational stages, the "Supervised" policy causes the server to send an acknowledgement request, and wait for a response for a given amount of time, to a remote operator and/or supervisor that are signed up to monitor and secure the site. Such acknowledgement by the operator and/or supervisor will cause the server to fix the selection and direct the guard accordingly. Within the above example, during the "Alert" stage, the server will calculate the best guard to deal with the alert and send an acknowledgement request to the operator and/or supervisor. An acknowledgement by the operator and/or supervisor will cause the server to push a notification to the selected guard's mobile terminal. The system administrator's settings will dictate the server's reaction to a delayed acknowledgement or an absence of acknowledgement and whether it shall go on and push the notification to the highest ranked guard, or act differently. Similarly, during the "Assessment" stage, the server will ask the operator and/or supervisor to acknowledge the alert that was found by the server to be the severest for the guard to handle.

The "Notified" policy set by the system administrator for the remaining stages of the operational flow will cause the server to notify the operator and/or supervisor that are signed up to monitor and secure the site, as to the location of dispatch and route that the server ranked as the highest and/or selected by the guard.

While the "Autonomous" policy sets that the server will set the guard's display to be available only for the guard to observe, any other policy will set the server to allow the terminals of the signed up operator and/or supervisor to access and observe the guard's display while being navigated to the dispatch location as well as during the interception stage, while the guard's mobile terminal engages into the augmented reality display once the guard's terminal device has determined that the guard has arrived at the location of dispatch.

Figure 10:
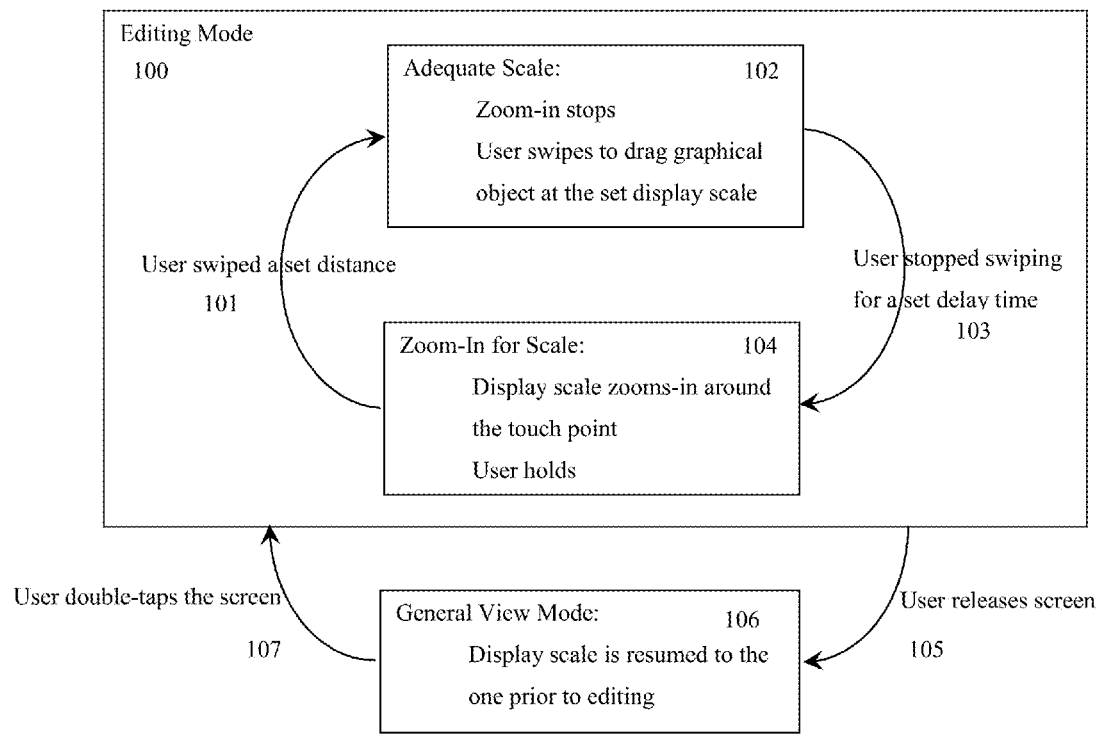
FIG. 10 is an illustration of a precision geometrical editing by use of a single gesture operation such as with touch screen interface, according to one embodiment of the invention.

According to another embodiment of the current invention, FIG. 10 shows a method that, in the absence of desktop workstations within a control center, allows fine editing of graphical objects based on single-gesture based interfaces. The method enables combined and simultaneous manipulation of graphical objects, while performing fine adjustments of the display's scale. The method may be applied to touchscreen based devices or other gesture based interfaces.

Graphical software vendors of desktop workstations utilize the desktop environment's advanced and flexible user inputs such as keyboards, mice and other means of user input. These enable the user to conveniently fine edit graphical objects, e.g. by means of mouse-dragging operation while manipulating the scale of the display, e.g. by means of the mouse's scrolling wheel. On the other hand, single gesture based interfaces, common in mobile platforms, absence those combined and rich interface means typical of desktop environment. Accordingly, prior art single gesture based interfaces, may allow the user to perform one operation at a time through distinct gestures. This forces the user to switch back and forth between object dragging for editing and display scale setting in an awkward way.

According to the embodiment of the current invention, the terminal device's processor will apply the following single gesture interface with the convention, as shown on FIG. 10, to enable double action. According to this convention, once the display is in edit mode (state 100 in FIG. 10), a moving gesture of the finger or any other pointing device (action 101 in FIG. 10), indicates for the device's processor, an object drag for editing operation, for which the display scale is adequate and no further scale adjustment is required (state 102 in FIG. 10). A stable holding gesture of the pointing device (action 103), on the other hand, signals the device's processor that the current display scale is too coarse and therefore, further zoom-in operation is required (state 104). Thus, if the display scale is detailed enough for editing, the user may initiate a move gesture, such as swipe the touch screen, to signal the device's processor to move an edited object. If, on the other hand, the editing requires finer display scale, the user may hold the object, in order to signal the device's processor to further zoom-in around the held object. After reaching the proper display scale, the user may start moving his pointing device, to indicate the device's processor that he can conveniently drag the object for editing. This will cause the device's processor to halt the zoom-in operation and preserve the display scale. Completion of the editing will be signaled by the user, releasing his pointing device (action 105). This will cause the device's processor to exit the editing mode (state 100) and get back to the general view mode initiating a zoom-out operation to show an overview of the edited object (state 106). Getting back to edit mode will be done by a different gesture such as double tap or any other distinct gesture (action 107).

According to another embodiment of the current invention, the two actions of zoom-in operation and object drag for editing operation shall be distinguished in order to enable the device's processor to reduce unnecessary transitions between these two operations. The transition into zoom-in operation from object drag for editing operation, as a result of the user stopping his swiping action, shall be delayed by a set amount of time. Similarly, the transition back to object moving operation, as a result of the user regaining his dragging action, shall be gated to a set degree of movement and performed only after the device's processor has determined that the user has moved his pointing location a certain set distance on the screen.

According to another embodiment of the current invention, those set delay and gated movement may be tuned by the device's processor according to the smoothness of the individual user's typical movements and gestures. Also, the speed of zoom-in and zoom-out operations may also be fine-tuned by the device's processor and fitted to the individual user's gestures.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A method for monitoring and securing a facility without employing a manned control center, comprising the following steps:
   a) providing a given security sensitive facility a plurality of distributed surveillance devices;
   b) providing a server, networked to said surveillance devices, access to a surveillance device and actuator database (SDD) in which is stored static or dynamic information related to deployment of said plurality of surveillance devices, and to a map information database (MID) in which is stored map data related to said facility;
   c.1) acquiring, by said server, a set of surveillance data associated with at least a portion of said facility from at least some of said plurality of surveillance devices, based on default coverage of said at least some of the plurality of surveillance devices;
   c.2) analyzing said set of surveillance data, by said server, to detect suspicious events associated with activity of an intruder;
   c.3) upon detecting a suspicious event:
      i) alerting a mobile terminal device carried by a first guard;
      ii) transmitting real time surveillance data to said mobile terminal device;
      iii) generating a map of the area surrounding a location of said suspicious event with a potential target being detected or identified in the form of a graphical indication on said map;
      iv) embedding said real-time surveillance data into said map and/or graphical indication by said server or mobile terminal device, to form a full situational awareness image;

c.4) continuously updating information provided to the first guard by repeating steps c.3.ii, c.3.iii, and c.3.iv above as said acquired surveillance data and/or analysis changes;

c.5) displaying said full situational awareness image within said mobile terminal device, for allowing said first guard to assess a severity of said suspicious event;

c.6) prompting said first guard to terminate said suspicious event if found by said first guard to be of a low severity, or otherwise, to initiate an interception operation;

c.7) transmitting results of an action of the first guard to said server; and d) during an interception operation intended to intercept and apprehend an intruder found by analysis of said acquired surveillance data to have intruded into said facility, determining a server-defined expected instantaneous location of said intruder based on a trajectory of said intruder in response to subsequently acquired surveillance data and on the map data associated with said trajectory and directing one or more dispatched guards towards said expected location, while displaying on the terminal devices of each of said dispatched guards, a location of other dispatched guards.

2. The method according to claim 1, further comprising dispatching one or more guards by:

a) determining, by the server, an instantaneous location of each guard on call by means of a location of a corresponding terminal device carried thereby;

b) determining whether each of the guards on call is located within a dispatchable distance to the indicated location of the suspicious event;

c) transmitting a wakeup signal or a push notification to selected guards located within said dispatchable distance; and d) setting the terminal device of each of said selected guards to an active mode.

3. The method according to claim 2, wherein a fused image is presented within a model of structures or objects of the facility, wherein elements of said model are settable to be transparent, facilitating observance of the acquired surveillance data, although being physically concealed from the guard's location.

4. The method according to claim 1, wherein the acquired default surveillance data is the surveillance data generated by one or more of the surveillance devices that allows an updated location of the intruder to be tracked and followed.

5. The method according to claim 1, wherein one of the dispatched guards uses the terminal device to request to receive surveillance data generated by another surveillance device.

6. The method according to claim 5, wherein the guard that requested to receive surveillance data uses his terminal device to actively control an instantaneous coverage generated by a corresponding surveillance device.

7. The method according to claim 1, further comprising transmitting, from the server to the terminal devices of one or more of said dispatched guards or generating by said terminal devices, displayable Obstructed Field Of View (OFOV) information that was generated in response to subsequently acquired surveillance data, wherein said OFOV information is indicative of a line of sight view between an instantaneous location of said terminal device of said one or more dispatched guards and the expected location of the intruder.

8. The method according to claim 7, further comprising whenever the intruder is not in the line of sight, toggling, by an initiating guard of said one or more dispatched guards, between the line of sight view and a guard selected view of the intruder that is displayable in a take-over mode and that is different than the line of sight view, while manipulating a user interface of the terminal device held or carried by said dispatched guards, if viewing of said guard selected view facilitates apprehension of said intruder, where during the take-over mode, the surveillance data to be acquired is controlled by the terminal device of said initiating guard and is transmitted directly thereto.

9. The method according to claim 1, wherein the server transmits commands to actuators of field deployed, remotely controllable lightning devices or locks and barriers, to dazzle the intruder or to change the available paths for the intruder and the guard.

10. The method according to claim 1, wherein the server is operable to disregard an intrusion alert acquired from a surveillance device located within a predetermined non-detectable region of the facility.

11. The method according to claim 1, wherein an intrusion alert is generated by a human scout, operating the mobile terminal device, to mark an actual location of a triggering event with or without the addition of an audio and/or visual descriptions of the event.

12. The method according to claim 1, wherein a single or multiple imaging data is cropped, unified and combined with a geographical display on the terminal device, to allow immediate assessment.

13. The method according to claim 12, wherein the combined display generates a fused image maintaining a perspectives of all data and images collected from the intruder's location and vicinity.

14. The method according to claim 13, further comprising analyzing location and orientation data of sensors of the mobile terminal device, thereby capturing an orientation of the mobile terminal device carried by the guard, and presenting a full situational awareness image to one or more of said dispatched guards, presented from their own perspective to facilitate quick understanding of a situation, while attaching the fused image collected from the intruder's location and vicinity to the location and orientation of the dispatched guard, as captured by the mobile terminal's sensors.

15. The method according to claim 13, wherein the perspective fused image includes the location of friendly guards and the guard is notified if another guard is in front of him or her to prevent friendly crossfire.

16. The method according to claim 1, wherein the surveillance data is captured from sensors, embedded within terminal devices that are carried by persons, situated close-by to the location of the suspicious event.

17. The method according to claim 1, wherein the server directs the dispatched guards to a specified location or area through a route that allows the guard to perform covert maneuvers and engage with the intruder from a safer direction, to facilitate safer interception.

18. The method according to claim 1, wherein a guard selected view is caused to be displayed by selecting a different surveillance device to capture a real-time location of the intruder while manipulating a user interface of the terminal device held or carried by one or more dispatched guards.

19. A system for monitoring and securing a facility without employing a manned control center, comprising:

a) a plurality of distributed and displaceable surveillance devices for acquiring a set of default surveillance data associated with at least a portion of said facility, based on default coverage of at least some of said plurality of surveillance devices;

b) a plurality of mobile terminal devices, each of which held or carried by a corresponding guard serving to protect said facility; and c) a server, networked to said plurality of surveillance devices and having access to a surveillance device and actuator database (SDD) in which is stored static or dynamic information related to deployment of said plurality of surveillance devices, and to a map information database (MID) in which is stored map data related to said facility, said server being configured to perform operations selected from the group consisting of:

c.1) acquire said acquired default surveillance data associated with said facility, from each of said surveillance devices and based on default coverage of said plurality of surveillance devices;

c.2) analyze said set of surveillance data, to detect suspicious events associated with activity of an intruder;

c.3) upon detecting a suspicious event:
 i) alert a selected one of said plurality of mobile terminal devices carried by a first guard;
 ii) transmit real time surveillance data to said selected mobile terminal device;
 iii) generate a map of an area surrounding a location of said suspicious event with a potential target being detected or identified in the form of a graphical indication on said map;
 iv) embed said real-time surveillance data into said map and/or graphical indication by said server or said selected mobile terminal device, to forma full situational awareness image;

c.4) continuously update information provided to the first guard by repeating steps c.3.ii, c.3.iii, and c.3.iv above as said acquired surveillance data and/or analysis changes;

c.5) display said full situational awareness image within said mobile terminal device, for allowing said first guard to assess a severity of said suspicious event;

c.6) prompt said first guard to terminate said suspicious event if found by said first guard to be of a low severity, or otherwise, to initiate an interception operation; and c.7) transmit results of an action of the first guard to said server;

wherein said server is configured to transmit to said plurality of terminal devices or said plurality of terminal devices are configured to generate, displayable Obstructed Field Of View (OFOV) information that was generated in response to subsequently acquired surveillance data, wherein said OFOV information is indicative of a line of sight view between an instantaneous location of the terminal device of a corresponding guard and a server-defined expected location of the intruder based on a trajectory of said intruder in response to subsequently acquired surveillance data and on the map data associated with said trajectory.

20. The system according to claim 19, wherein the server is additionally operable to transmit a wakeup signal to the corresponding terminal device of one or more guards located within a dispatchable distance from a location of an activity that has been detected within said facility, to ensure that said one or more guards will be involved in the interception operation.

21. System according to claim 19, in which at least a part of the server operations are performed by one of more of the terminal devices held or carried by a corresponding guard.

22. A method for monitoring and securing a facility without employing a manned control center, comprising the following steps:

a) providing a given security sensitive facility with a plurality of distributed surveillance devices;

b) providing a server, networked to said surveillance devices, access to a surveillance device and actuator database (SDD) in which is stored static or dynamic information related to deployment of said plurality of surveillance devices, and to a map information database (MID) in which is stored map data related to said facility;

c.1) acquiring, by said server, a set of surveillance data associated with at least a portion of said facility from at least some of said plurality of surveillance devices, based on default coverage of said at least some of the plurality of surveillance devices;

c.2) analyzing said set of surveillance data, by said server, to detect suspicious events associated with activity of an intruder;

c.3) upon detecting a suspicious event:
 i) alerting a mobile terminal device carried by a first guard;
 ii) transmitting real time surveillance data to said mobile terminal device;
 iii) generating a map of the area surrounding a location of said suspicious event with a potential target being detected or identified in the form of a graphical indication on said map;
 iv) embedding said real-time surveillance data into said map and/or graphical indication by said server or mobile terminal device, to form a full situational awareness image;

c.4) continuously updating information provided to the first guard by repeating steps c.3.ii, c.3.iii, and c.3.iv above as said acquired surveillance data and/or analysis changes;

c.5) displaying said full situational awareness image within said mobile terminal device, for allowing said first guard to assess a severity of said suspicious event;

c.6) prompting said first guard to terminate said suspicious event if found by said first guard to be of a low severity, or otherwise, to initiate an interception operation; and d) controlling, by the first guard, one or said surveillance devices to track said potential target and provide updated surveillance data.

23. A system for monitoring and securing a facility without employing a manned control center, comprising:

a) a plurality of distributed and displaceable surveillance devices for acquiring a set of default surveillance data associated with at least a portion of said facility, based on default coverage of at least some of said plurality of surveillance devices;

b) a plurality of mobile terminal devices, each of which held or carried by a corresponding guard serving to protect said facility; and c) a server, networked to said plurality of surveillance devices and having access to a surveillance device and actuator database (SDD) in which is stored static or dynamic information related to deployment of said plurality of surveillance devices, and to a map information database (MID) in which is stored map data related to said facility, said server being configured to perform operations selected from the group consisting of:
  c.1) acquire said acquired default surveillance data associated with said facility, from each of said surveillance devices and based on default coverage of said plurality of surveillance devices;
  c.2) analyze said set of surveillance data, to detect suspicious events associated with activity of an intruder;
  c.3) upon detecting a suspicious event:
    i) alert a selected one of said plurality of mobile terminal devices carried by a first guard;
    ii) transmit real time surveillance data to said selected mobile terminal device;
    iii) generate a map of an area surrounding a location of said suspicious event with a potential target being detected or identified in the form of a graphical indication on said map;
    iv) embed said real-time surveillance data into said map and/or graphical indication by said server or said selected mobile terminal device, to form a full situational awareness image;
  c.4) continuously update information provided to the first guard by repeating steps c.3.ii, c.3.iii, and c.3.iv above as said acquired surveillance data and/or analysis changes;
  c.5) display said full situational awareness image within said mobile terminal device, for allowing said first guard to assess a severity of said suspicious event;
  c.6) prompt said first guard to terminate said suspicious event if found by said first guard to be of a low severity, or otherwise, to initiate an interception operation;
  c.7) transmit results of an action of the first guard to said server; and
  c.8) determine, during an interception operation intended to intercept and apprehend said intruder found by analysis of said acquired surveillance data to have intruded into said facility, an expected instantaneous location of said intruder based on a trajectory of said intruder in response to subsequently acquired surveillance data and on the map data associated with said trajectory and to direct one or more dispatched guards towards said expected location, while displaying on the terminal device of each of said dispatched guards, locations of other dispatched guards.

24. A system for monitoring and securing a facility without employing a manned control center, comprising:
  a) a plurality of distributed and displaceable surveillance devices for acquiring a set of default surveillance data associated with at least a portion of said facility, based on default coverage of at least some of said plurality of surveillance devices;
  b) a plurality of mobile terminal devices, each of which held or carried by a corresponding guard serving to protect said facility; and
  c) a server, networked to said plurality of surveillance devices and having access to a surveillance device and actuator database (SDD) in which is stored static or dynamic information related to deployment of said plurality of surveillance devices, and to a map information database (MID) in which is stored map data related to said facility, said server being configured to:
    c.1) acquire said acquired default surveillance data associated with said facility, from each of said surveillance devices and based on default coverage of said plurality of surveillance devices;
    c.2) analyze said set of surveillance data, to detect suspicious events associated with activity of an intruder;
    c.3) upon detecting a suspicious event:
      i) alert a first of said plurality of mobile terminal devices carried by a first guard;
      ii) transmit real time surveillance data to said selected mobile terminal device;
      iii) generate a map of an area surrounding a location of said suspicious event with a potential target being detected or identified in the form of a graphical indication on said map;
      iv) embed said real-time surveillance data into said map and/or graphical indication by said server or said selected mobile terminal device, to form a full situational awareness image;
    c.4) continuously update information provided to the first guard by repeating steps c.3.ii, c.3.iii, and c.3.iv above as said acquired surveillance data and/or analysis changes;
    c.5) display said full situational awareness image within said first mobile terminal device, for allowing said first guard to assess a severity of said suspicious event;
    c.6) prompt said first guard to terminate said suspicious event if found by said first guard to be of a low severity, or otherwise, to initiate an interception operation;
    c.7) transmit results of an action of the first guard to said server; and
    c.8) toggle, in response to selection of an initiating guard holding or carrying said first or a second of said plurality of mobile terminal devices, between a line of sight view and a guard selected view of the intruder that is displayable in a take-over mode and that is different than the line of sight view, while manipulating a user interface of said first or said second of said plurality of terminal devices, if viewing of said guard selected view facilitates apprehension of said intruder, where during the take-over mode, the surveillance data to be acquired is controlled by said first or said second of said plurality of terminal devices of said initiating guard and is transmitted directly thereto.

25. System according to claim 24, in which the server is further adapted to determine, during the interception operation which is intended to intercept and apprehend the intruder found by analysis of said acquired surveillance data to have intruded into said facility, an expected instantaneous location of said intruder based on a trajectory of said intruder in response to subsequently acquired surveillance data and on the map data associated with said trajectory and to direct one or more dispatched guards towards said expected location, while displaying on the terminal devices of each of said dispatched guards, locations of other dispatched guards.

* * * * *